US010432822B2

(12) United States Patent
Dobashi et al.

(10) Patent No.: US 10,432,822 B2
(45) Date of Patent: Oct. 1, 2019

(54) COLOR CONVERSION LUT CREATION APPARATUS, IMAGE PROCESSING APPARATUS THAT PERFORMS COLOR CONVERSION PROCESSING BY USING COLOR CONVERSION LUT, CREATION METHOD OF COLOR CONVERSION LUT, AND STORAGE MEDIUM

(71) Applicant: CANON KABUSHIKI KAISHA, Tokyo (JP)

(72) Inventors: Toshiyuki Dobashi, San Jose, CA (US); Hisashi Ishikawa, Urayasu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/050,519

(22) Filed: Jul. 31, 2018

(65) Prior Publication Data
US 2019/0045085 A1    Feb. 7, 2019

(30) Foreign Application Priority Data
Aug. 4, 2017    (JP) ................................ 2017-151535

(51) Int. Cl.
*H04N 1/52*    (2006.01)
*H04N 1/60*    (2006.01)
*B41J 2/21*    (2006.01)

(52) U.S. Cl.
CPC ............... *H04N 1/52* (2013.01); *H04N 1/605* (2013.01); *H04N 1/6025* (2013.01);
(Continued)

(58) Field of Classification Search
CPC .......... H04N 1/00015; H04N 1/00023; H04N 1/00034; H04N 1/00045; H04N 1/00068;
(Continued)

(56) References Cited

U.S. PATENT DOCUMENTS 7,605,945 B2 * 10/2009 Kondo .................... H04N 1/603
                                                        345/604
8,854,690 B2 * 10/2014 Ukishima ............ H04N 1/6022
                                                        358/3.23
(Continued)

FOREIGN PATENT DOCUMENTS

JP    H02215541 A    8/1990
JP    2008132796 A    6/2008

*Primary Examiner* — Scott A Rogers
(74) *Attorney, Agent, or Firm* — Rossi, Kimms & McDowell LLP

(57) ABSTRACT

A color conversion LUT creation apparatus includes a derivation unit that derives an output value corresponding to a signal value in an input image for a plurality of virtual color materials whose number is smaller than a number of actual color materials used in an image forming apparatus; a setting unit that sets a target number of dots printed per unit area of the actual color material; and a conversion unit that converts an output value of the plurality of virtual color materials into an output value of the actual color material and creates a color conversion LUT in which the input value and the output value of the actual color material are associated with each other. The setting unit sets the target number of dots based on dispersibility of a dot pattern corresponding to each tone level of a dither matrix used for halftone processing.

20 Claims, 26 Drawing Sheets

(52) U.S. Cl.
CPC ......... *H04N 1/6027* (2013.01); *H04N 1/6038*
(2013.01); *B41J 2/21* (2013.01)

(58) Field of Classification Search
CPC .. H04N 1/00082; H04N 1/00087; H04N 1/52;
H04N 1/60; H04N 1/6016; H04N 1/6019;
H04N 1/6022; H04N 1/6025; H04N
1/6027; H04N 1/603; H04N 1/6033;
H04N 1/6038; G06K 15/027; G06K
15/1878; G06K 15/1881
See application file for complete search history.

(56) References Cited

U.S. PATENT DOCUMENTS

| | | | |
|---|---|---|---|
| 10,187,553 B2* | 1/2019 | Takesue | H04N 1/603 |
| 2018/0295258 A1* | 10/2018 | Ochiai | H04N 1/6025 |
| 2018/0324327 A1* | 11/2018 | Moribe | H04N 1/6033 |
| 2019/0124231 A1* | 4/2019 | Takesue | H04N 1/52 |

* cited by examiner

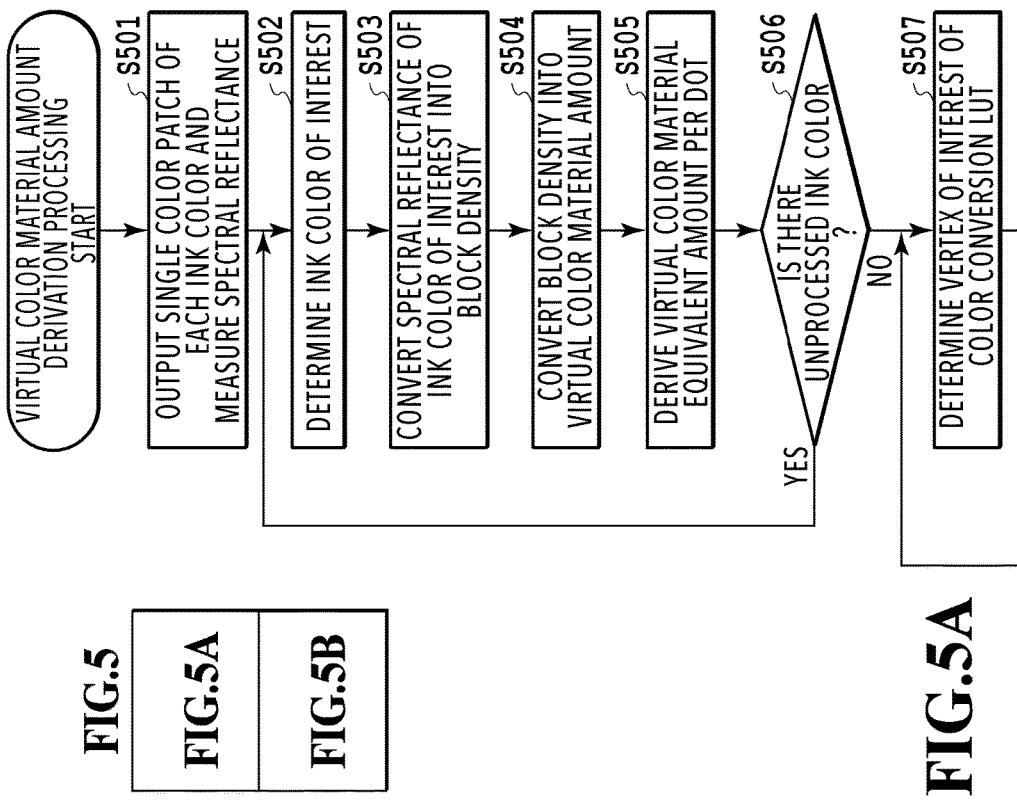

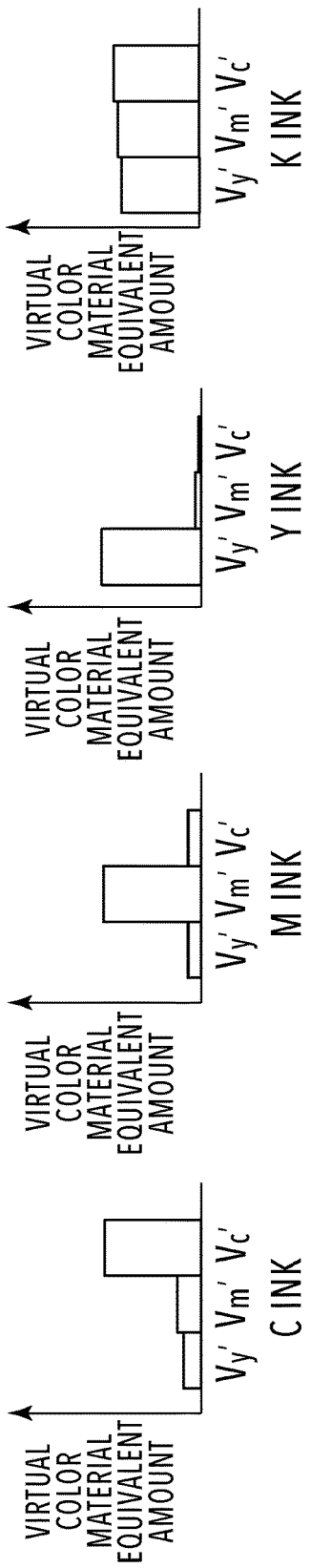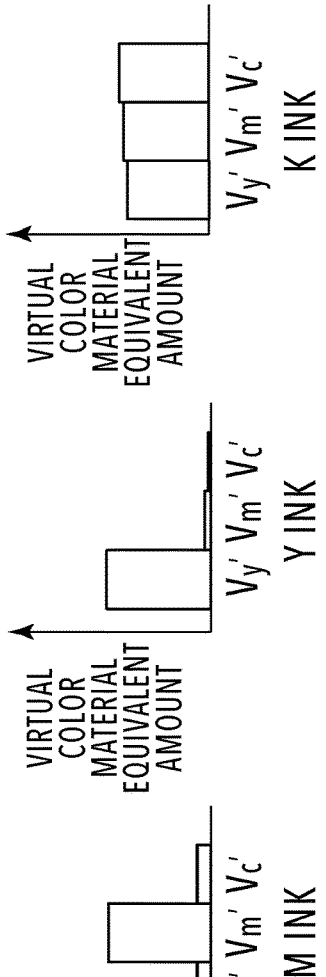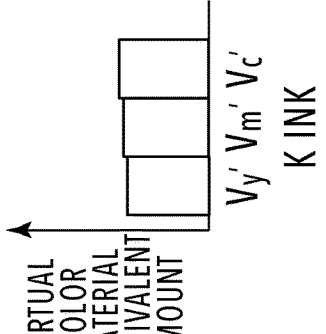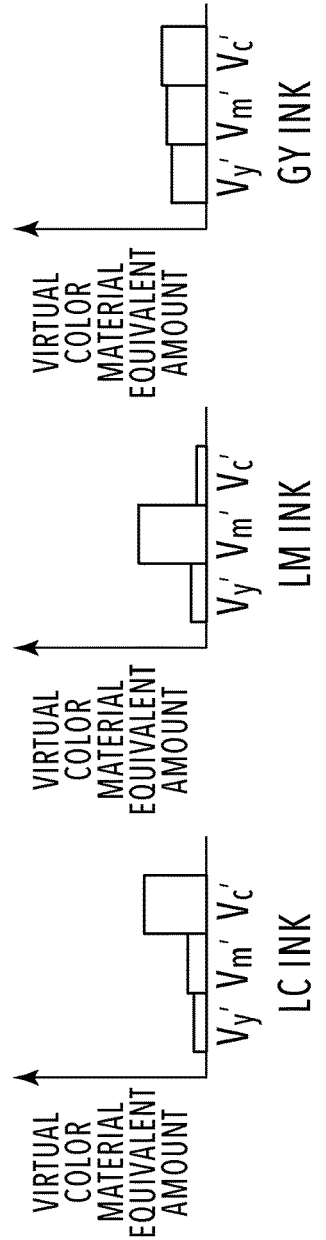

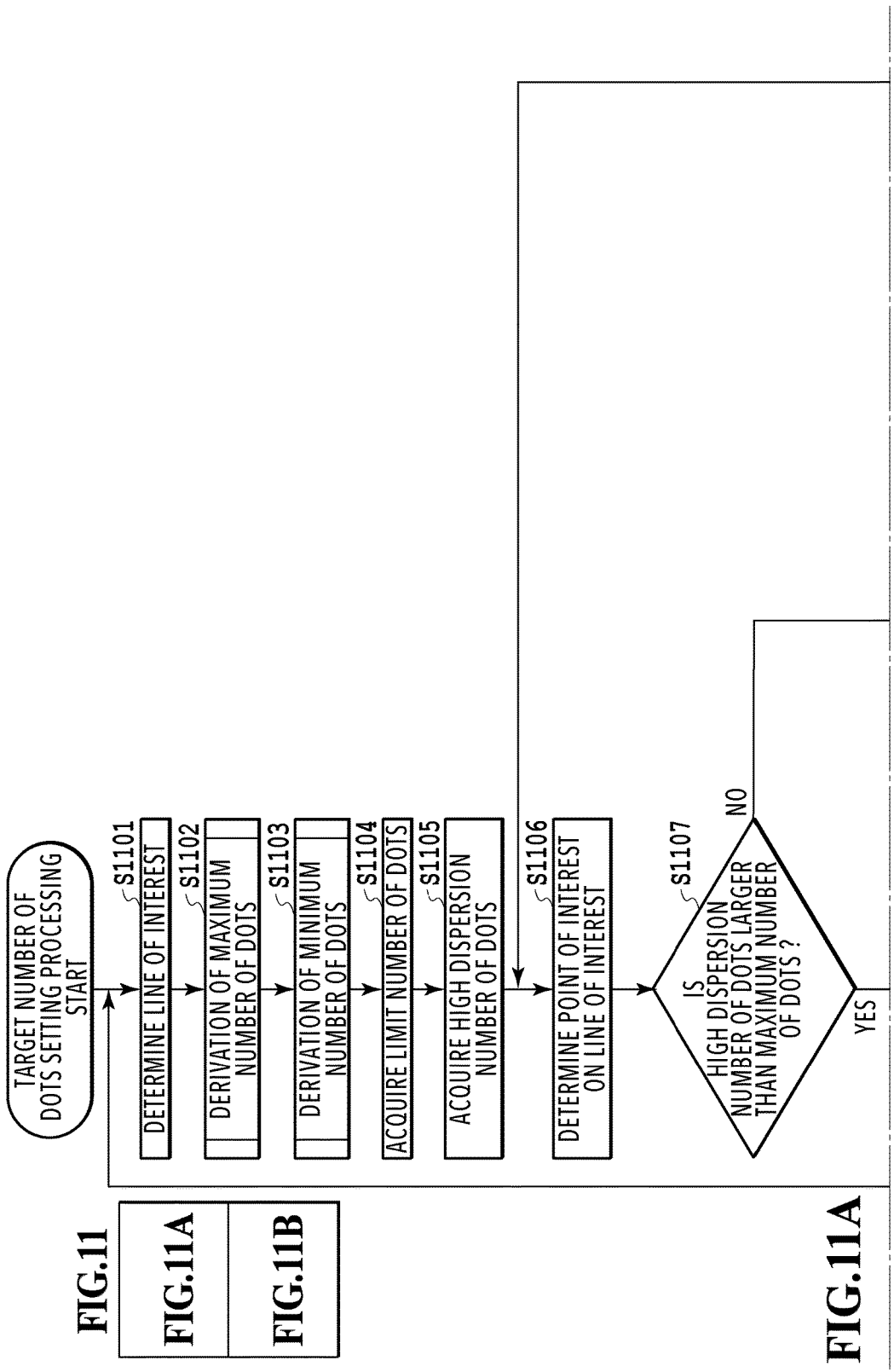

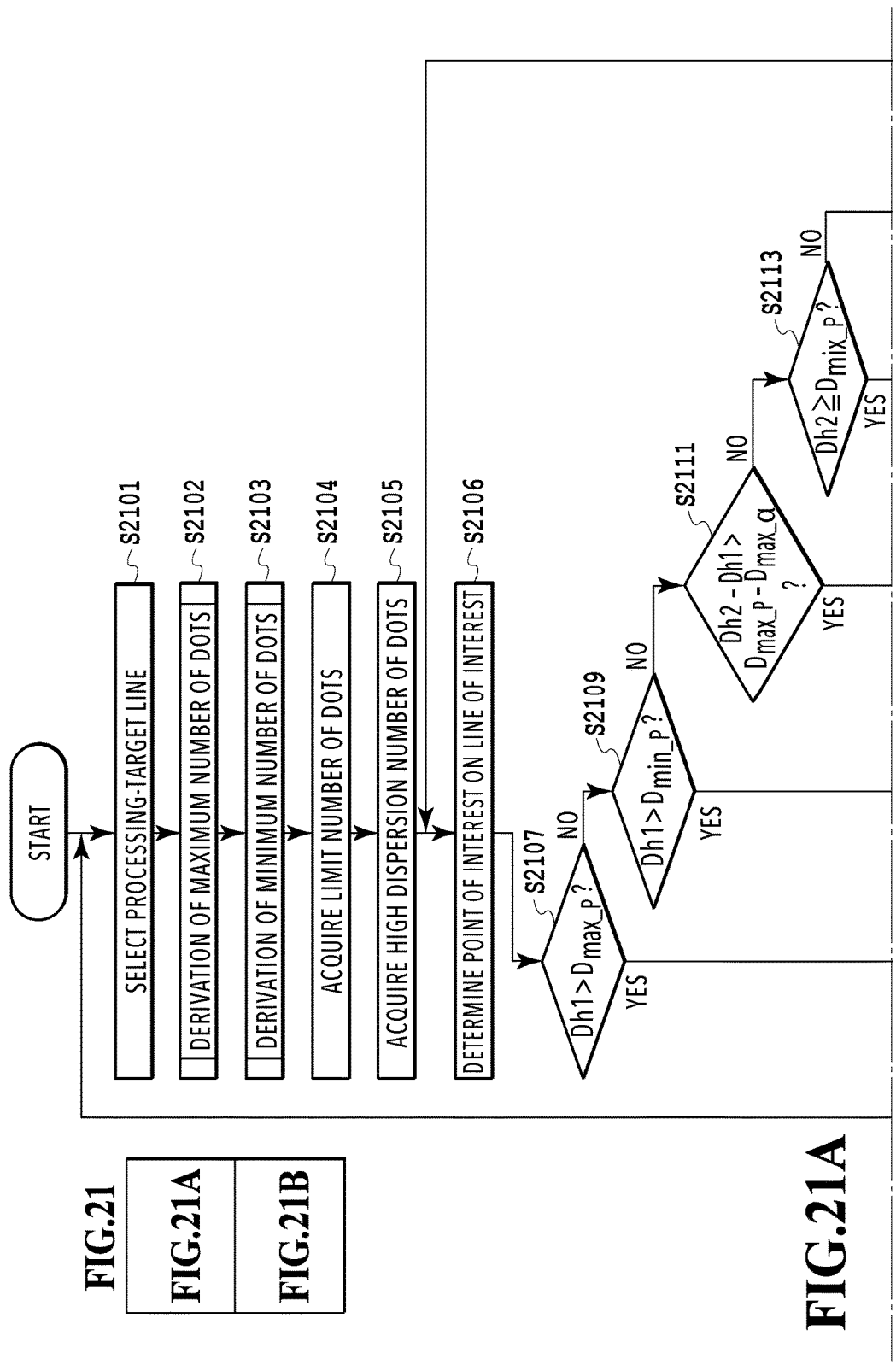

COLOR CONVERSION LUT CREATION APPARATUS, IMAGE PROCESSING APPARATUS THAT PERFORMS COLOR CONVERSION PROCESSING BY USING COLOR CONVERSION LUT, CREATION METHOD OF COLOR CONVERSION LUT, AND STORAGE MEDIUM

BACKGROUND OF THE INVENTION

Field of the Invention

The present invention relates to color conversion processing to convert a value in an input image into a value corresponding to a plurality of color material components that a printer handles.

Description of the Related Art

A printer, represented by an ink jet printer or an electrophotographic printer, generates print data by receiving a signal (normally, RGB color signal) making up an image as an input value and converting the input value into the amount of color material (for example, ink of CMYK and toner) used in the printer. Depending on the setting of the color material amount of the printer, the image quality, such as gradation properties, color reproduction accuracy, and granularity, changes, and therefore, the conversion processing from an image signal into a color material amount is important.

The printer that is the mainstream at present converts the color material amount into a binary dot pattern by the publicly known dither method and the like and represents an image by on/off of a dot. Because of this, in the area in which the image density is low (highlight area), the dot density is reduced, and as a result of this, dots are formed sparsely and such a problem occurs that dots become conspicuous (granulation). Regarding the granulation, for example, a technique has been proposed which implements printing excellent in granularity by preparing a dark-color ink whose density is high and a pale-color ink whose density is low for the same color and by controlling ejection of these inks (Japanese Patent Laid-Open No. H02-215541(1990)).

However, in the technique of Japanese Patent Laid-Open No. H02-215541(1990) described above, inks are allocated simply in the order from the pale-color ink to the input value (gradation value) in an image, and there is such a problem that ink consumption increases. Regarding this point, a technique has been proposed which reduces ink consumption by a creating print rate table of dark-color and pale-color inks so that a dot of the dark-color ink is caused to appear from a tone level lower than the tone level at which the dot density by the pale-color ink becomes maximum and by performing dark-color and pale-color conversion based on this (Japanese Patent Laid-Open No. 2008-132796).

However, the technique of Japanese Patent Laid-Open No. 2008-132796 described above does not take into consideration dispersibility of a dot pattern printed by the created print rate table. Because of this, there is a case where dispersibility deteriorates in the dot pattern obtained by combining the dot pattern of the dark-color ink and the dot pattern of the pale-color ink, which are formed on a sheet (printing medium), and as a result of this, there is a case where granularity deteriorates.

SUMMARY OF THE INVENTION

The color conversion LUT creation apparatus according to the present invention includes: a derivation unit configured to derive an output value corresponding to an input value in an input image for a plurality of virtual color materials whose number is smaller than a number of actual color materials used in an image forming apparatus; a setting unit configured to set a target number of dots of the actual color material, which is a target of a number of dots printed per unit area; and a conversion unit configured to convert an output value of the plurality of virtual color materials into an output value of the actual color material so that a total value of numbers of dots of the actual color material coincides with the target number of dots and create a color conversion LUT in which the input value and the output value of the actual color material are associated with each other, and the setting unit sets the target number of dots based on dispersibility of a dot pattern corresponding to each tone level of a dither matrix used for halftone processing.

Further features of the present invention will become apparent from the following description of exemplary embodiments with reference to the attached drawings.

BRIEF DESCRIPTION OF THE DRAWINGS

FIG. 5 is a diagram showing the relationship of FIGS. 5A and 5B;

FIG. 5A is a flowchart showing details of derivation processing of a virtual color material amount;

FIG. 7A to FIG. 7G are each an example of a virtual color material equivalent amount per dot of each ink;

FIG. 11 is a diagram showing the relationship of FIGS. 11A and 11B;

FIG. 11A is a flowchart showing details of setting processing of a target number of dots according to a first embodiment;

FIG. 21 is a diagram showing the relationship of FIGS. 21A and 21B;

FIG. 21A is a flowchart showing details of setting processing of a target number of dots according to a second embodiment;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

In the following, embodiments of the present invention are explained with reference to the drawings. The following embodiments are not intended to limit the present invention and all combinations of features explained in the embodiments are not necessarily indispensable to the solution of the present invention.

First Embodiment (Configuration Example of Printing System)

Figure 1:
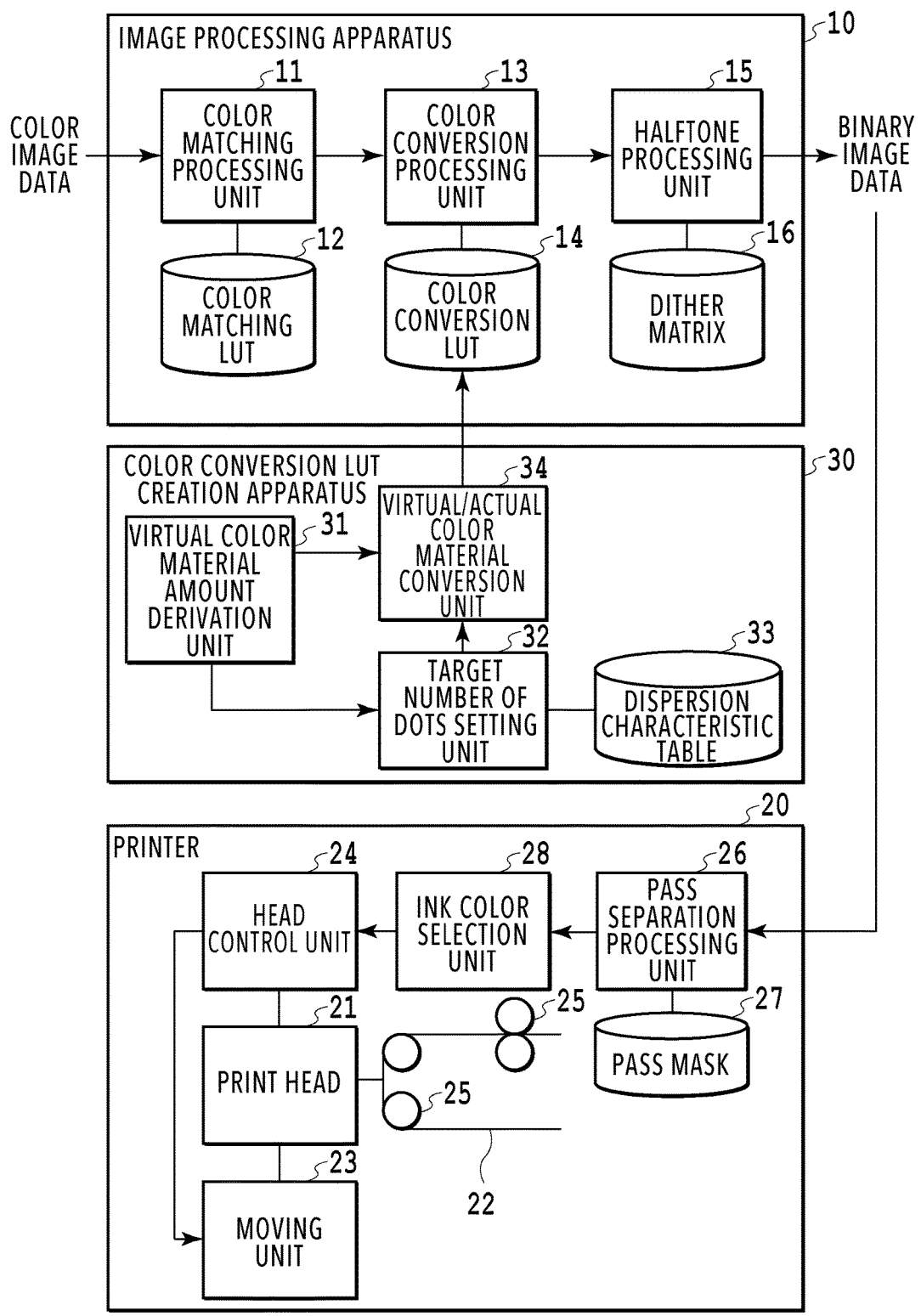
FIG. 1 is a block diagram showing an example of a configuration of a printing system.

FIG. 1 is a block diagram showing an example of a configuration of a printing system according to the present embodiment. The printing system of the present embodiment includes three apparatuses: an image processing apparatus 10, a printer (image forming apparatus) 20, and a color conversion LUT creation apparatus 30. In the following explanation, as the printer 20, an ink jet printer is supposed and explanation is given by taking an aspect as an example in which for an input image, the amount of ink used in the printer is derived. However, the present invention is not limited to an ink jet printer and it is also possible to apply the present invention to other printing schemes, such as a thermal dye-sublimation printer, a laser printer, and a UV curable ink jet printer. Further, the configuration may be one in which the image processing apparatus 10 is made up of a dedicated image processing circuit, such as ASIC, and the printer 20 includes the circuit. Furthermore, the configuration may be one in which the printer 20 includes both the functions of the image processing apparatus 10 and the color conversion LUT creation apparatus 30. In the following, each apparatus is explained by taking the system configuration in FIG. 1 as an example.

<Configuration of Image Processing Apparatus 10>

The image processing apparatus 10 is connected to the printer 20 by a printer interface or a circuit. The image processing apparatus 10 includes, for example, a printer driver installed in a general personal computer and the like.

Image data representing a printing-target image input to the image processing apparatus 10 is sent to a color matching processing unit 11. Here, the input image data is, for example, color image data including an image signal (input value) represented in an RGB color space and representing each of RGB by eight bits. The color matching processing unit 11 performs color matching processing for input color image data and corrects the color represented by the image signal of RGB. By this color matching processing, even in the case where a printer or a printing medium having different color reproduction characteristics is used, it is possible to obtain uniform color reproduction. The color matching processing unit 11 performs color matching processing by referring to a three-dimensional color matching LUT 12 stored in an HDD or the like, not shown schematically.

A color conversion processing unit 13 receives color image data corrected in the color matching processing unit 11 and generates an image (ink value image) corresponding to the color of ink used in the printer 20. In the present embodiment, it is assumed that ink value images of seven planes corresponding to a total of seven colors of cyan (C), magenta (M), yellow (Y), black (K), light cyan (LC), light magenta (LM), and gray (GY). In this ink value image also, each color is represented by eight bits. The color conversion processing unit 13 performs color conversion processing by referring to a three-dimensional color conversion LUT 14 stored in an HDD or the like, not shown schematically. The color conversion LUT 14 used at this time is created by the color conversion LUT creation apparatus 30, to be described later.

A halftone processing unit 15 performs quantization processing to convert the ink value images of the seven planes obtained by the color conversion processing unit 13 into a binary value (or multivalue whose number of values is three or more, which is the number of tone levels smaller than the number of input tone levels). In the present embodiment, as the method of halftone processing, the publicly known dither method is used. The halftone processing unit 15 performs halftone processing (hereinafter, dither processing) by using a dither matrix 16 stored in an HDD or the like, not shown schematically. The binary image data generated by the halftone processing unit 15 is output to the printer 20.

<Configuration of Printer 20>

The printer 20 forms the binary image data generated in the image processing apparatus 10 on a printing medium by moving a print head 22 vertically and horizontally relative to a printing medium (sheet) 22. The print head 21 has a plurality of print elements (nozzles). In the present embodiment, seven color inks of cyan, magenta, yellow, black, light cyan, light magenta, and gray are mounted in the print head 21. A moving unit 23 moves the print head 21 under the control of a head control unit 24. A conveyance roller 25 conveys a printing medium under the control of the head control unit 24. In the present embodiment, a multipass printing method of completing an image by performing a plurality of times of scan by the print head 21 on a printing medium is used. A pass separation processing unit 26 generates scanned data of each color based on the binary image data of each color generated by the image processing apparatus 10 and a pass mask 27. An ink color selection unit 28 selects the relevant ink color from the ink colors mounted on the print head 21 based on the scanned data.

<Configuration of Color Conversion LUT Creation Apparatus>

The color conversion LUT creation apparatus 30 includes a virtual color material amount derivation unit 31, a target number of dots setting unit 32, and a virtual/actual color material conversion unit 34. The color conversion LUT creation apparatus 30 is, for example, a general personal computer and the like and implements each processing unit of the virtual color material amount derivation unit 31, the target number of dots setting unit 32, and the virtual/actual color material conversion unit 34 by a central processing unit (CPU), not shown schematically, executing predetermined programs.

The virtual color material amount derivation unit 31 derives a virtual color material amount corresponding to the input RGB value. The target number of dots setting unit 32 sets a target number of dots for the entire area of the color conversion LUT based on dispersibility of a dot pattern for each tone level of the dither matrix 16 used at the time of dither processing. The virtual color material amount derivation unit 31 sets a target number of dots by using a dispersion characteristic table 33. The dispersion characteristic table 33 is a table indicating a relationship between dispersibility of a dot pattern and the number of dots, which is associated with the dither matrix 16 used at the time of dither processing. The dither matrix 16 determines in advance a dot pattern that is output for each tone level. Consequently, it is possible for the dither matrix 16 to associate dispersibility of a dot pattern for each tone level.

The virtual/actual color material conversion unit 34 converts the virtual color material amount derived by the virtual color material amount derivation unit 31 into an amount (actual color material amount) of ink of ink color actually used in the printer 20. At this time, conversion is performed so that the total number of dots of all the ink colors becomes the target number of dots set by the target number of dots setting unit 32. Then, a color conversion LUT whose input value is an RGB value and whose output value is an actual color material amount after conversion is generated and provided to the image processing apparatus 10.

(Flow of Printing Processing)

Figure 2:
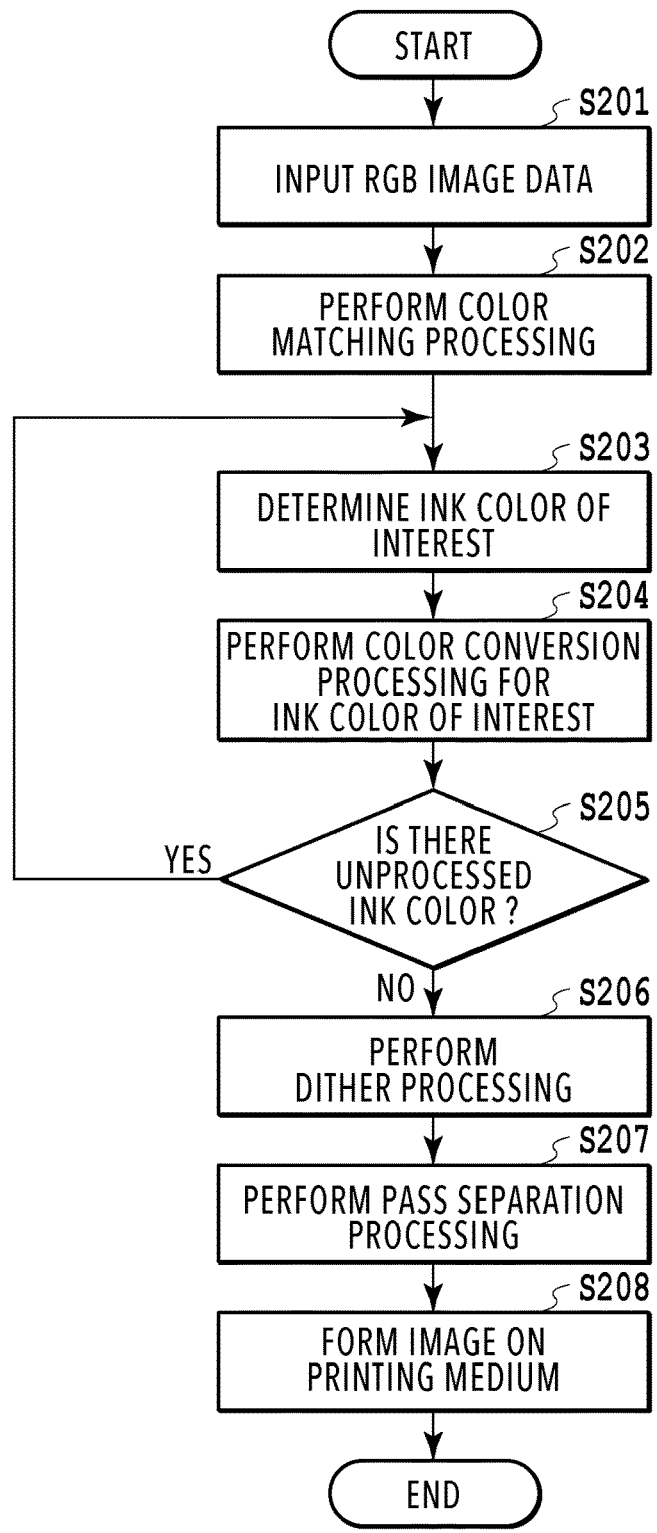
FIG. 2 is a flowchart showing a flow until printing processing is performed for input color image data in a printer.

Next, a rough flow until the printer 20 performs printing processing for input color image data in the printing system according to the present embodiment is explained with reference to a flowchart in FIG. 2.

First, printing-target RGB image data is input to the image processing apparatus 10 (step 201). Next, in the color matching processing unit 11, color matching processing for the input RGB image data is performed (step 202). Then, as the preprocessing of color conversion processing, an ink color (output color) on which attention is focused and which is taken to be a target of color conversion is determined from the seven kinds of ink color described previously (step 203). For example, in the present embodiment, the ink color of interest is determined in the order of cyan, magenta, yellow, black, light cyan, light magenta, and gray, but another order may be accepted.

Then, in the color conversion processing unit 13, based on the color image data whose color has been corrected by the color matching processing, an ink value image for the ink color of interest (for example, cyan) determined at step 203 is generated (step 204). At this time, the color conversion LUT provided from the color conversion LUT creation apparatus 30 is used. Then, whether the color conversion processing has been completed for all the (here, seven in total) ink colors is determined (step 205). In the case where the color conversion processing has been completed, the processing advances to step 206. On the other hand, in the case where the color conversion processing has not been completed, the processing returns to step 203, and the next ink color of interest is determined and the processing is continued.

In the case where the color conversion processing has been completed for all the ink colors, in the halftone processing unit 15, dither processing to convert the image data after the color conversion processing into binary image data is performed (step 206). The binary image data after the dither processing is output to the printer 20 in an arbitrary size, such as the size of the entire image and the size corresponding to the bandwidth for each predetermined unit printing area.

In the printer 20 having received the binary image data, in the pass separation processing unit 26, pass separation processing to convert the binary image data into scanned data is performed (step 207). Then, the ink color in conformity with the scanned data after the conversion is selected in the ink color selection unit 28 and image formation is started (step 208). In the image formation, the print head 21 ejects each ink by driving each nozzle at regular drive intervals while moving relative to the printing medium and forms an image on the printing medium. The printing medium is conveyed by a predetermined amount of conveyance for each scan and the entire image is formed.

The above is the rough flow until the printer 20 performs printing processing for the input color image data in the printing system.

(Creation of Color Conversion LUT)

Figure 3:
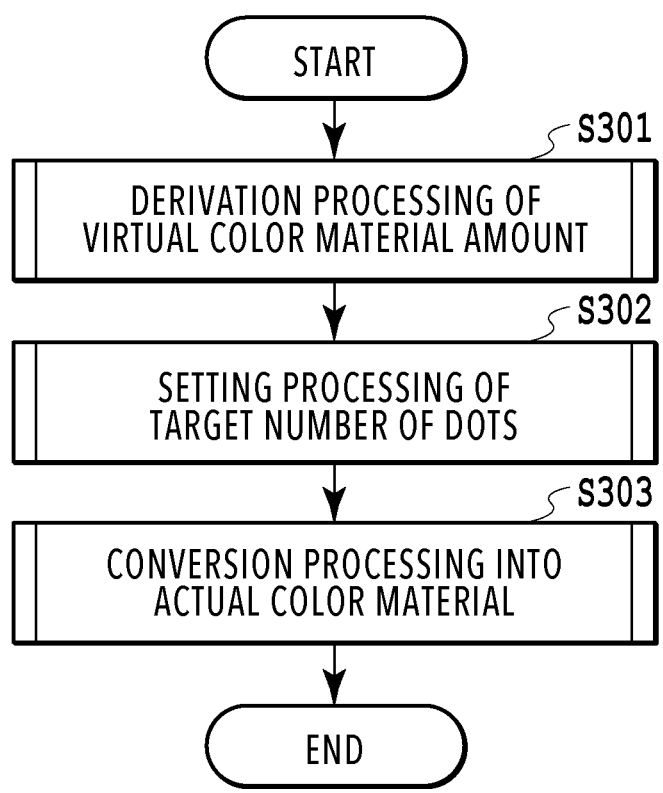
FIG. 3 is a flowchart showing a flow at the time of creating a color conversion LUT.

Next, a rough flow until the color conversion LUT 14 is created in the color conversion LUT creation apparatus 30 is explained by using a flowchart in FIG. 3. Here, explanation is given by taking the case as an example where a color conversion LUT for performing color conversion of the input RGB signal into an output signal corresponding to the ink colors of cyan, magenta, yellow, black, light cyan, light magenta, and gray is created.

At step 301, in order to create a color conversion LUT in which discontinuity in gradation is less in the virtual color material amount derivation unit 31, a virtual color material amount is derived as an intermediate signal at the time of converting the input RGB signal into the ink amount of each ink color. In order to implement smooth output gradation in the color conversion processing, it is necessary for the output image density to change smoothly for the input image signal. That is, in the case where it is possible to implement color conversion processing in which the output image density changes smoothly for the input image signal, smooth output gradation can be achieved. However, as the number of inks used in the printer increases, it becomes more difficult to derive an ink amount that causes the image density to change smoothly. Consequently, in the present embodiment, first, virtual color materials whose number is smaller than the number of inks (actual color materials) used in the printer 20 and whose absorption wavelength bands do not overlap one another in principle are defined. In the present embodiment, as the virtual color materials, the inks of three colors of yellow, magenta, and cyan, which are the three primary colors of subtractive color mixture, are used. Then, the virtual color materials that cause the characteristics of the output value of the virtual color materials (virtual color material amount) for the input RGB value change smoothly in the entire color area are found. In this manner, the virtual color material amount for each input RGB signal value of the color conversion LUT is derived.

Figure 4A:
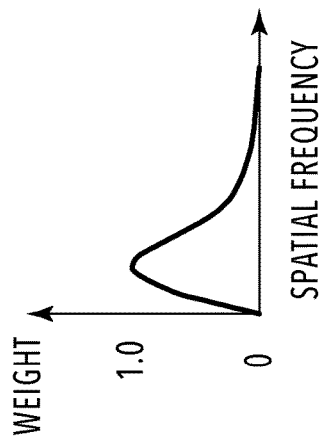
FIG. 4A to FIG. 4D are diagrams explaining dispersibility of a dither matrix.
Figure 4B:
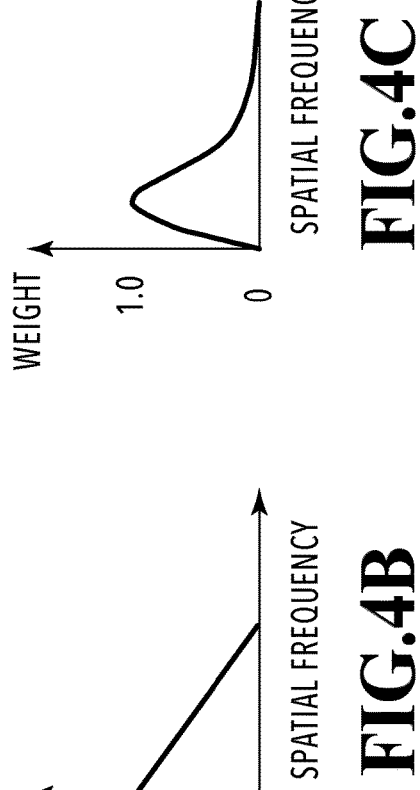
Figure 4C:
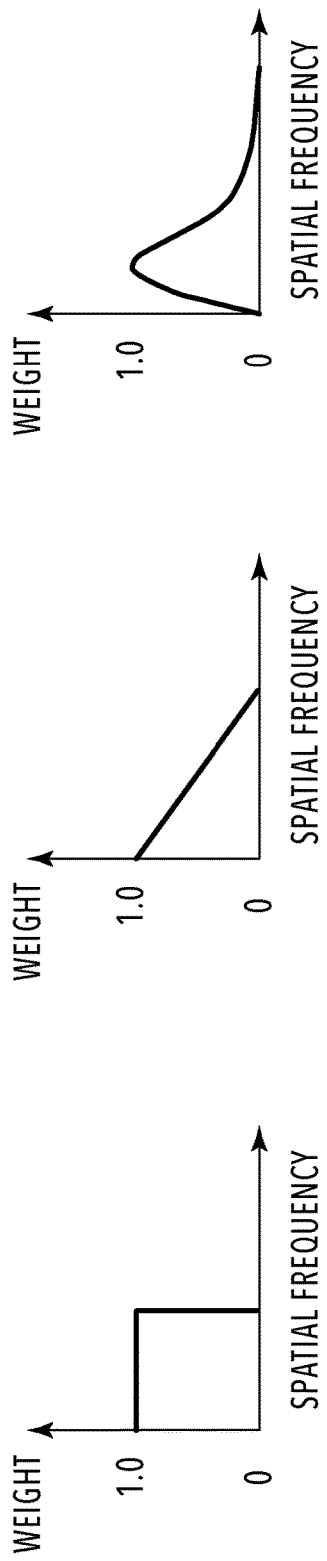
Figure 4D:
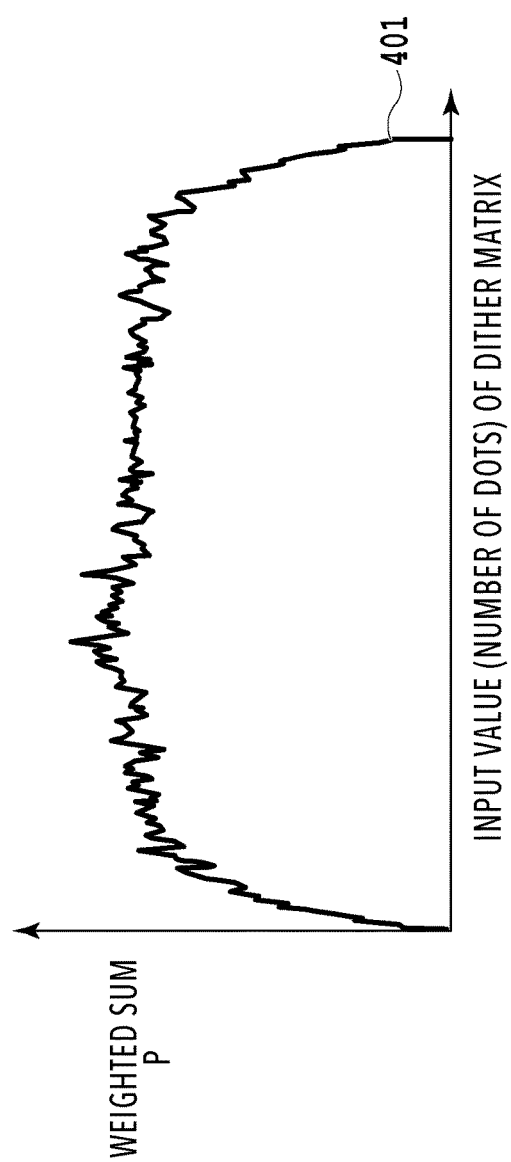

Next, at step 302, in the target number of dots setting unit 32, the target value of the number of dots of the ink printed per unit area is set. Specifically, the target number of dots is set for each point of the color cube so that the number of dots becomes constant with which the dot pattern after the dither processing becomes high dispersion. The high dispersion here means the so-called blue noise characteristics that the distribution of the spectrum of the spatial frequency characteristics of a dot pattern exists on the higher-frequency side. As an index indicating the degree of dispersibility, a power weighted sum P obtained by performing Fourier transformation for a dot pattern is used. The power weighting coefficient is set so that a larger weight is given to a lower frequency by, for example, functions shown in FIG. 4A to FIG. 4C. Alternatively, it may also be possible to use the visual transfer function (VTF) of the human eyesight as the power weighting coefficient. A characteristic curve 401 in a graph in FIG. 4D in which the horizontal axis represents the input signal and the vertical axis represents the weighted sum P described above shows an example of dispersibility for the input value of the dither matrix. The larger the value of the weighted sum P, the lower dispersion is and the smaller the value, the higher dispersion is.

Lastly, at step 303, in the virtual/actual color material conversion unit 34, in accordance with the priority of conversion of the actual color material determined in advance, the virtual color material amount is converted into the ink amount based on a substantially linear conversion formula. That is, from the virtual color material amount corresponding to each input RGB signal value of the color conversion LUT, the ink amount of each ink color is found. At this time, the ratio of the number of dots of a dark-color ink and the number of dots of a pale-color ink is adjusted so that the total value of the numbers of dots of the inks coincides with the target value set at step 302. Due to this, it is possible to cause the dot pattern that is printed to become high dispersion and to create a color conversion LUT excellent in granularity.

The above is the rough flow of the color conversion LUT creation processing in the color conversion LUT creation apparatus 30. Following the above, each process of derivation of a virtual color material amount, setting of a target number of dots, and conversion from a virtual color material amount into an actual color material amount is explained in detail.

<Virtual Color Material Amount Derivation Processing>

Figure 5B:
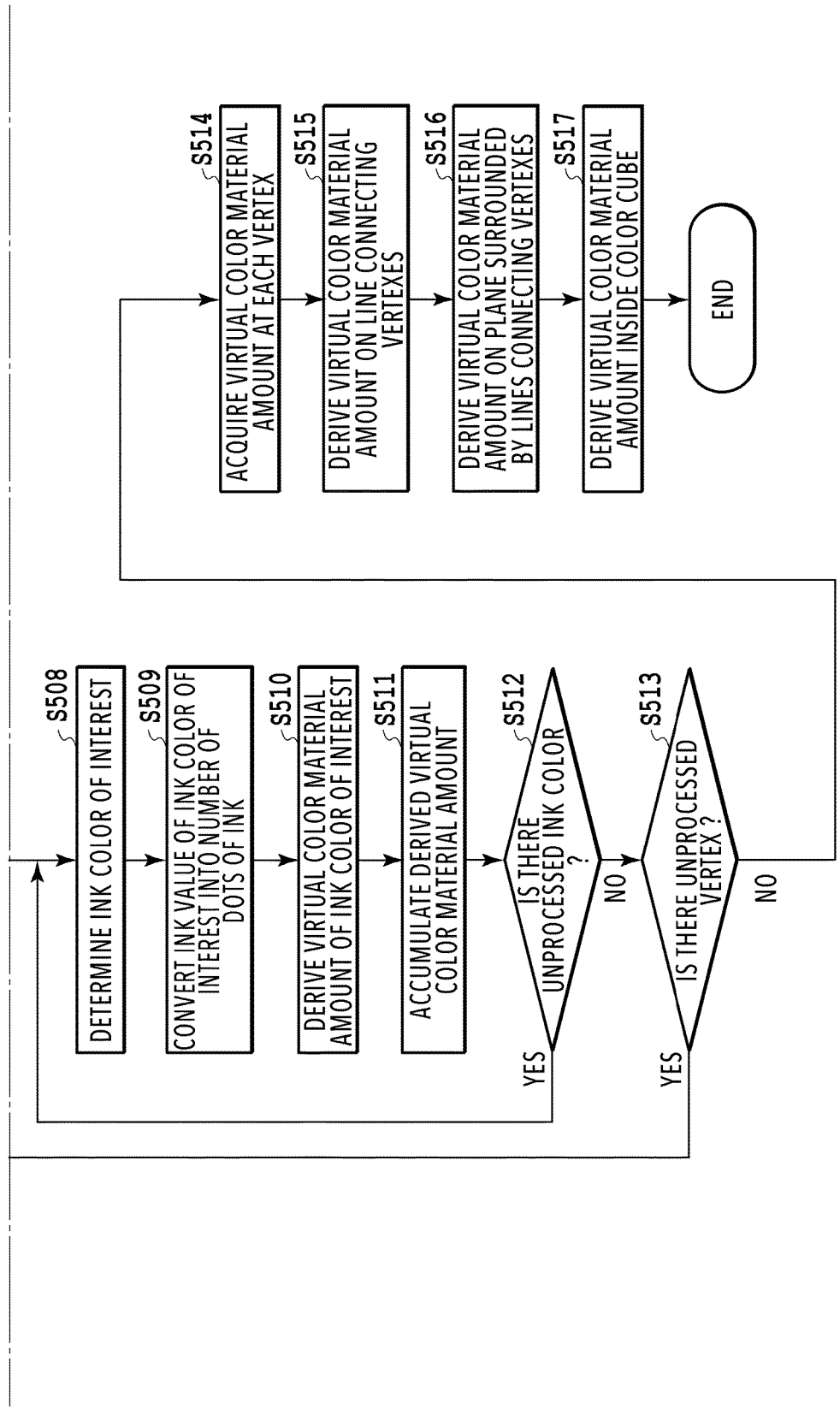
FIG. 5B is a flowchart showing details of derivation processing of a virtual color material amount.

FIG. 5 is a flowchart showing details of the virtual color material amount derivation processing at step 301. In the following, explanation is given along the flow in FIG. 5.

At step 501 to step 506, processing to find a virtual color material equivalent amount per dot (per unit amount of material to be applied, hereinafter, amount of material to be applied is referred to as applied material amount) of each ink is performed. Specifically, first at step 501, after outputting a single color patch of each ink color, the spectral reflectance of each patch is measured. In the present embodiment, single color patches corresponding to seven colors, whose applied material amount is 25(%), are formed on the printing medium 22 and the spectral reflectance of the single color patch is measured by a spectral colorimeter at intervals of 10 nm from 380 nm to 730 nm. The single color patch whose applied material amount is 25% here represents a patch in the case where the ratio of pixels to which a dot is applied is 25% per unit area in the binary image data corresponding to one color of ink generated by the halftone processing unit 15. The applied material amount is not limited to 25% and it may be possible to set an applied material amount (for example, in a range from 5% to 50%) from the highlight portion to the halftone portion where the spectral reflectance is likely to change linearly for the number of dots.

Next, at step 502, an ink color on which attention is focused is determined. Specifically, by a variable i specifying a processing-target ink color, a specific ink color is specified. In the present embodiment in which a total number of ink colors is seven, it is assumed that cyan (C): 0, magenta (M): 1, yellow (Y): 2, black (K): 3, light cyan (LC): 4, light magenta (LM): 5, and gray (GY): 6 are allocated as the values of the variable i. In the stage immediately after the start of processing, the cyan ink whose i is 0 as the initial value is determined to be the ink color of interest.

Next, at step 503, the spectral reflectance obtained by measuring the single color patch of the ink color of interest is converted into a block density. Specifically, a spectral reflectance R (l) of the ink color of interest measured at step 501 is divided into three wavelength blocks and block reflectances Ry, Rm, and Rc, which are values obtained by averaging the spectral reflectance within each block, are converted into block densities Dy, Dm, and Dc, respectively. The three wavelength blocks correspond to the wavelength band (380 to 480 nm) that the yellow (Y) ink mainly absorbs, the wavelength band (480 to 580 nm) that the magenta (M) ink mainly absorbs, and the wavelength band (580 to 730 nm) that the cyan (C) ink mainly absorbs, respectively. For the conversion from the spectral reflectances Ry, Rm, and Rc into the block densities Dy, Dm, and Dc, expression (1A) to expression (1C) below are used.

$$Dy=-\log 10(Ry) \qquad \text{expression (1A)}$$

$$Dm=-\log 10(Rm) \qquad \text{expression (1B)}$$

$$Dc=-\log 10(Rc) \qquad \text{expression (1C)}$$

Next, at step 504, the block densities Dy, Dm, and Dc are converted into virtual color material amounts. In the case where the virtual color material amounts of the three virtual color materials (yellow, magenta, cyan) corresponding to the three wavelength blocks are taken to be Vy, Vm, and Vc, respectively, each virtual color material amount is expressed by expression (2A) to expression (2C) below. These expressions follow Lambert's law that states that the optical density is proportional to the amount (thickness) of the color material in the range where light scattering can be ignored.

$$Vy=Ky\times Dy \qquad \text{expression (2A)}$$

$$Vm=Km\times Dm \qquad \text{expression (2B)}$$

$$Vc=Kc\times Dc \qquad \text{expression (2C)}$$

Figure 6:
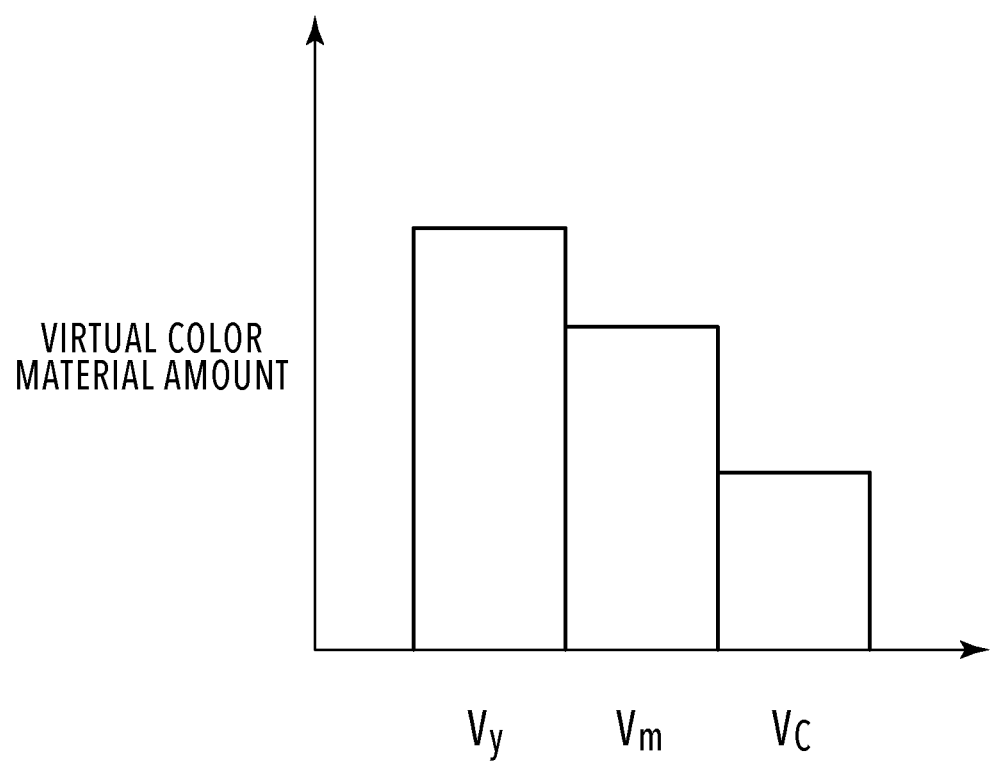
FIG. 6 is an example of a virtual color material amount.

In expression (2A) to expression (2C) described above, Ky, Km, and Kc are constants of proportion in relation to the yellow density, the magenta density, and the cyan density, respectively and in the present embodiment, it is assumed that all of the constants of proportion is 1. An example of the virtual color material amounts Vy, Vm, and Vc at this time is shown in FIG. 6. In the example in FIG. 6, the virtual color material amounts Vy=84.8[%], Vm=65.1[%], and Vc=34.9[%]. For example, the virtual color material amount Vy=84.8% means that the yellow ink as the virtual color material is applied to the corresponding pixel with a probability of 84.8% on the average and an ink dot is formed.

Next, at step 505, based on the virtual color material amounts Vy, Vm, and Vc found at step 504, virtual color material equivalent amounts Vy', Vm', and Vc' per dot are derived.

Here, the virtual color material equivalent amount is the amount of the virtual color material in the case where an ink as the actual color material is represented by equivalent virtual color materials. As shown in expression (3A) to expression (3C) below, the virtual color material equivalent amounts Vy', Vm', and Vc' per dot are found by dividing the virtual color material amounts Vy, Vm, and Vc by a number of dots R.

$$Vy'=(Vy/R) \quad \text{expression (3A)}$$

$$Vm'=(Vm/R) \quad \text{expression (3B)}$$

$$Vc'=(Vc/R) \quad \text{expression (3C)}$$

That is, in the case where the applied material amount of the single color patch is 25%, the values obtained by dividing the virtual color material amounts Vy, Vm, and Vc by 25 are the virtual color material equivalent amounts Vy', Vm', and Vc' per dot. For example, in the case where the applied material amount of the single color patch is 25%, and Vy=84.8[%], Vm=65.1[%], and Vc=34.9[%], Vy', Vm', and Vc' are 3.39[%], 2.60[%], and 1.40[%], respectively.

Next, at step 506, whether the processing up to step 505 has been completed for all the ink colors is determined. In the case where the processing has been completed, the processing advances to step 507. On the other hand, in the case where there is an unprocessed ink color, the processing returns to step 502, and the next ink color is determined to be the ink color of interest (variable i is incremented) and the processing is continued.

FIG. 7A to FIG. 7G are each a diagram showing an example of a virtual color material equivalent amount per dot for each ink color. FIG. 7A shows the virtual color material equivalent amounts per dot of the cyan ink. From FIG. 7A, it is known that the virtual color material equivalent amount of the cyan component is larger than those of the yellow component and the magenta component for the cyan ink. Similarly, FIG. 7B shows the virtual color material equivalent amounts per dot for the ink of magenta, FIG. 7C shows those for the ink of yellow, FIG. 7D shows those for the ink of black, FIG. 7E shows those for the ink of light cyan, FIG. 7F shows those for the ink of light magenta, and FIG. 7G shows those for the ink of gray, respectively. From FIG. 7A to FIG. 7G it is known that for the magenta-based inks, the virtual color material equivalent amount of the magenta component is large, for the yellow ink, that of the yellow component is large, and for the achromatic black ink and gray ink, the ratios of the three components are substantially the same.

Figure 8:
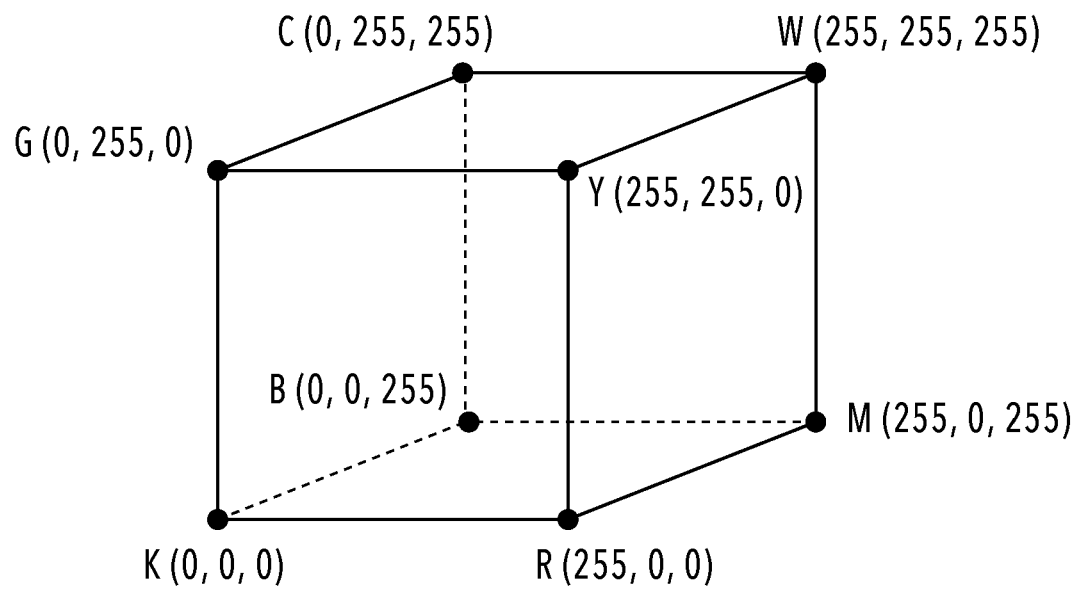
FIG. 8 is a schematic diagram of a color cube.

In the case where derivation of the virtual color material equivalent amount per dot of each ink color is completed, next, at step 507 to step 513, processing to find the virtual color material amount of all the ink colors at the eight vertexes of the color conversion LUT is performed. In this case, the eight vertexes refer to the input RGB signals located in the eight corners in the color cube representing the three input components in the input RGB signal by the R-axis, the G-axis, and the B-axis. The colors corresponding to these eight vertexes are also called the primary colors. In FIG. 8, a color cube schematically representing the color conversion LUT is shown. Here, the input R value, the input G value, and the input B value are represented by an 8-bit signal of 0 to 255. At this time, the signal value (R, B) at each vertex is K (0, 0, 0), B (0, 0, 25), G (0, 255, 0), C (0, 255, 255), R (255, 0, 0), M (255, 0, 255), Y (255, 255, 0), and W (255, 255, 255). Further, the virtual color material amount of all the ink colors refers to the virtual color material amount obtained by adding up the virtual color material amount of each ink color in the same input RGB signal. Like the virtual color material amount of each ink color, the virtual color material amount of all the ink colors is calculated for each of the three wavelength blocks. In the following each piece of the processing at step 507 to step 513 is explained in detail.

First, at step 507, a vertex on which attention is focused in the color conversion LUT is determined. Specifically, by a variable p specifying a processing-target vertex of the eight vertexes, a specific vertex is specified. In the present embodiment, it is assumed that numbers from 0 to 7 are allocated in order to the eight vertexes of K, B, G, C, R, M, Y, and W. In the stage immediately after the start of processing, K (0, 0, 0) whose p is 0 as the initial value is determined to be the vertex of interest.

Next, at step 508, an ink color on which attention is focused is determined. This processing is the same as the processing at step 502 described previously. That is, by the variable i specifying a processing-target ink color, a specific ink color is specified.

Next, at step 509, the ink value of the ink color of interest i at the vertex of interest p is acquired and the acquired ink value is converted into the number of dots (applied material amount). That is, the ink value is a value obtained by representing the applied material amount by an integer, and for example, in the case where the ink value is represented by eight bits, on a condition that the applied material amount is 100%, the ink value is 255. The ink value here is set in advance so that the color reproduction range becomes as wide as possible. It may also be possible to use the ink value of the vertex by referring to an already-existing color conversion LUT in place of setting an arbitrary value in advance. Here, in the case where the ink value of the ink color i at the vertex of interest p is taken to be V (p, i), a unit applied material amount Q (p, i) (%) of the ink is expressed by expression (4) below.

$$Q(p,i)=(V(p,i)/255)*100 \quad \text{expression (4)}$$

Here, it is assumed that the vertex of interest p is R (R, B)=(255, 0, 0) and the ink value corresponding to R is magenta=127, yellow=128, and cyan=0. Further, it is assumed that as the virtual color material equivalent amount per dot, magenta: (Vy', Vm', Vc')=(0.3, 0.9, 0.2)[%] and yellow: (Vy', Vm', Vc')=(0.8, 0.1, 0.0)[%] are calculated. On a condition that the ink value i for each ink color in this case is converted into the number of dots (applied material amount), the results will be as follows, respectively.

magenta: (127/255)×100=49.8[%]

yellow: (128/255)×100=50.2[%]

cyan, light cyan, light magenta, gray, black: each 0[%]

Next, at step 510, the virtual color material amount of the ink color of interest i at the vertex of interest p is derived. Here, the virtual color material equivalent amounts per dot of the ink color of interest i at the vertex of interest p are taken to be Vy' (p, i), Vm' (p, i), and Vc' (p, i) and the virtual color material amounts of the ink color of interest i at the vertex of interest p are taken to be Vy (p, i), Vm (p, i), and Vc (p, i). In this case, the virtual color material amounts of the ink color of interest i at the vertex of interest p are expressed by expression (5A) to expression (5C) below.

$$Vy(p,i)=Vy'(p,i)*Q(p,i) \quad \text{expression (5A)}$$

$$Vm(p,i)=Vm'(p,i)*Q(p,i) \quad \text{expression (5B)}$$

$$Vc(p,i)=Vc'(p,i)*Q(p,i) \quad \text{expression (5C)}$$

The above-described expression (5A) to expression (5C) mean that which amount of the virtual color material per dot is included for the ink value acquired at step 509 is calculated for each virtual color material of yellow, magenta, and cyan. For example, the virtual color material amount for each ink color in the case where the vertex of interest p is R (R, B, B)=(255, 0, 0) is as follows.

magenta: (0.3, 0.9, 0.2)×49.8=(14.94, 44.82, 9.96) [%]

yellow: (0.8,0.1,0.0)×50.2=(40.16, 5.02, 0.0)[%]

cyan, light cyan, light magenta, gray, black: each (0, 0, 0)[%]

Next, at step 511, an accumulated virtual color material amount obtained by accumulating the virtual color material amount of the ink color of interest i at the vertex of interest p derived at step 510 is found. This is done for finding the virtual color material amount corresponding to all the ink colors (seven colors in total) at the vertex of interest p. Specifically, Vy (p, i), Vm (p, i), and Vc (p, i) found by expression (5A) to expression (5C) described previously are added to Vy_ALL (p), Vm_ALL (p), and Vc_ALL (p), respectively, which represent the accumulated virtual color material amount for each of the three virtual color materials. For example, the accumulated virtual color material amounts in the case where the vertex of interest p is R (R, B)=(255, 0, 0) are as follows.

*Vy*_ALL(*p*): 14.94+40.16+0=55.1[%]

*Vm*_ALL(*p*): 44.82+5.02+0=49.84[%]

*Vc*_ALL(*p*): 9.96+0+0=9.96[%]

It is assumed that each of the accumulated virtual color material amounts Vy_ALL (p), Vm_ALL (p), and Vc_ALL (p) is initialized (0 is set as the initial value) before the loop of the first ink color of interest is started.

Next, at step 512, whether the processing up to step 511 has been completed for all the ink colors is determined. In the case where the processing has been completed, the processing advances to step 513. On the other hand, in the case where there is an unprocessed ink color, the processing returns to step 508, and the next ink color is determined to be the ink color of interest (variable i is incremented) and the processing is continued.

Next, at step 513, whether the processing up to step 512 has been completed for all the vertexes is determined. In the case where the processing has been completed, the processing advances to step 514. On the other hand, in the case where there is an unprocessed vertex, the processing returns to step 507, and the next vertex is determined to be the vertex of interest (variable p is incremented) and the processing is continued.

In the case where derivation of the accumulated virtual color material amount corresponding to all the ink colors at all the vertexes has been completed, following this, at step 514 to step 517, the virtual color material amount corresponding to all the input RGB signals of the color conversion LUT is derived. All the input RGB signals are, for example, in the case where each of the input R value, the input G value, and the input B value is represented by an 8-bit signal from 0 to 255, combinations of 256×256×256 (corresponding to about 16.78 million colors) input signals. In the present embodiment, the virtual color material amount for each axis of RGB is derived and the value between each axis is found by interpolation processing, and thereby, the virtual color material amount capable of implementing gradation properties smooth in all the input RGB signals is obtained. In the following, detailed explanation is given.

At step 514, the virtual color material amounts corresponding to all the ink colors (seven colors in total) at each vertex, that is, the values of the accumulated virtual color material amounts Vy_ALL (p), Vm_ALL (p), and Vc_ALL (p) described previously are acquired.

Next, at step 515, the virtual color material amount on a line connecting vertexes is derived. At this time, derivation is performed so that the virtual color material amount changes smoothly. For example, a function that passes from a predetermined point to another predetermined point, which is monotonically increasing, and which has no point of inflection (the second derivative is not negative) is defined and the virtual color material amount on the line connecting the predetermined points is determined. Alternatively, another interpolation method, such as linear interpolation, may be applied and what is required is to be able to determine a virtual color material amount in such a manner in which the change of the virtual color material amount is monotonically increasing and produces no point of inflection. As an example, a case is shown where the virtual color material amount between a vertex W of white (255, 255, 255) and a vertex C of cyan (0, 255, 255) is derived. In this case, it is possible to find virtual color material amounts Vy (P), Vm (P), and Vc (P) at a point P located on the line connecting the vertex W and the vertex C by linear interpolation expressions expressed by expression (6A) to expression (6C) below, respectively.

$$Vy(P)=Vy(W)+(Vy(C)-Vy(W))\times x/L \qquad \text{expression (6A)}$$

$$Vm(P)=Vm(W)+(Vm(C)-Vm(W))\times x/L \qquad \text{expression (6B)}$$

$$Vc(P)=Vc(W)+(Vc(C)-Vc(W))\times x/L \qquad \text{expression (6C)}$$

In expression (6A) to expression (6C) described above, the virtual color material amounts at the vertex W are Vy (W), Vm (W), and Vc (W), respectively, and the virtual color material amounts at the vertex C are Vy (C), Vm (C), and Vc (C), respectively. Further, L indicates the distance between the vertex W and the vertex C on the RGB space and x indicates the distance between the vertex W and the point P on the RGB color space, respectively. It is also possible to find the virtual color material amount on the line connecting other vertexes by the same linear interpolation described above.

Figure 9:
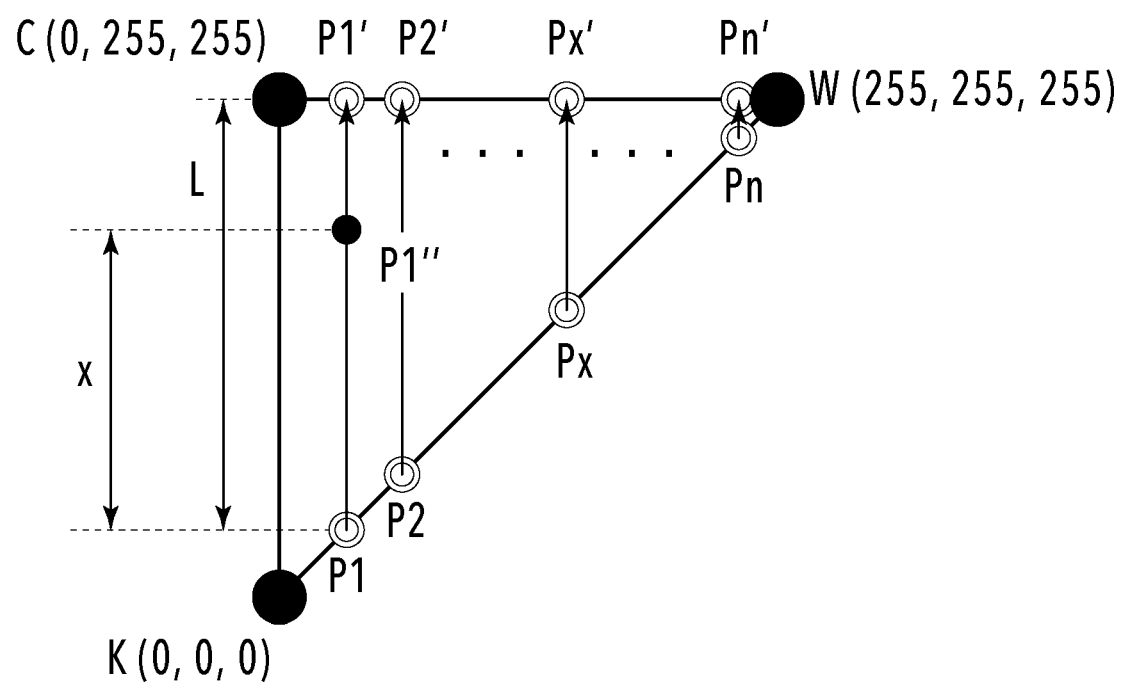
FIG. 9 is a diagram showing the way a virtual color material amount is calculated.
Figure 10A:
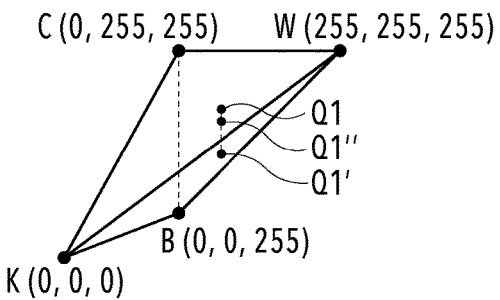
FIG. 10A to FIG. 10F are schematic diagrams showing six tetrahedrons including a K-W line.
Figure 10B:
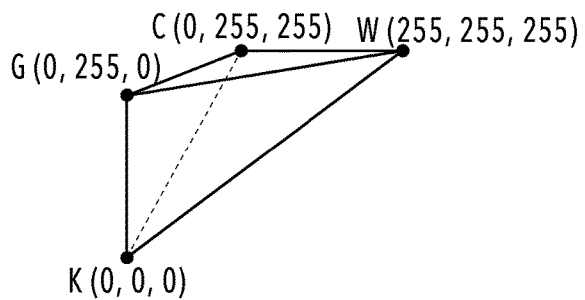
Figure 10C:
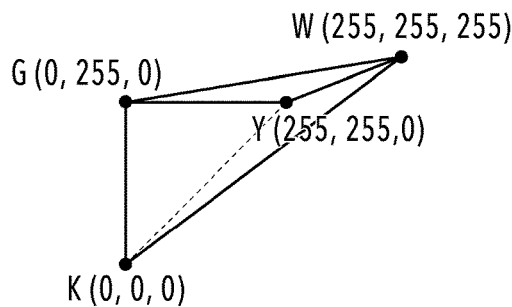
Figure 10D:
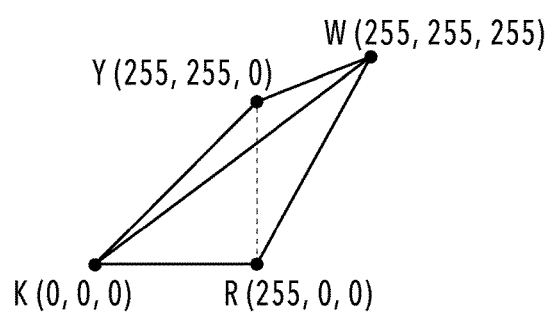
Figure 10E:
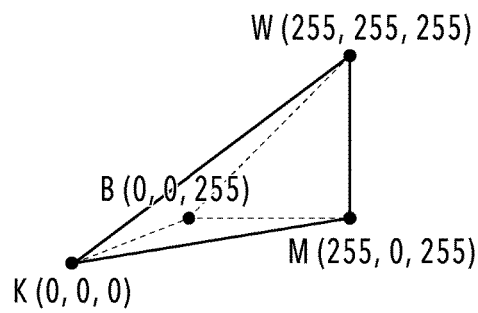
Figure 10F:
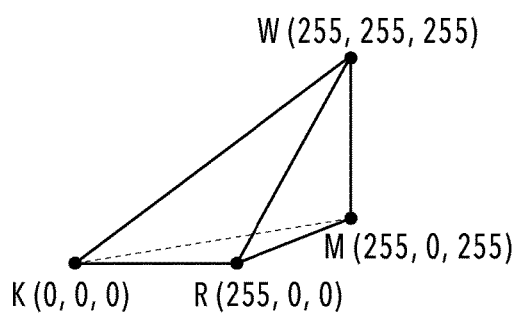

Next, at step 516, the virtual color material amount on the plane surrounded by the lines connecting vertexes is derived. For example, the virtual color material amount on the plane made up of a W-K line connecting the vertex W of white and a vertex K of black and one of the other vertexes (R, B, C, M, Y) is determined by the same method as that at step 515. In this case, the virtual color material amounts on the six planes including the W-K line are determined. Here, FIG. 9 is a diagram showing the way the virtual color material amount on a W-K-C plane is determined. First, the virtual color material amounts at a point Px on the W-K line and at an intersection Px' of a perpendicular dropped from the point Px to a C-W line and the C-W line are acquired. Then, from the acquired virtual color material amounts, the virtual color material amount on the line connecting the point Px and the point Px' is determined by a higher-order function or publicly known interpolation processing, such as linear interpolation. For example, in the case where a virtual color material amount Vy (P1") in a virtual color material y at a point P1" on the line connecting a point P1 and a point P' is calculated by linear interpolation, it may be possible to use expression (6') below.

$$Vy(P1")=Vy(P1)+(Vy(P1')-Vy(P1))\times x/L \qquad \text{expression (6')}$$

In expression (6') described above, Vy (P1) is the amount of the virtual color material y at the point P1 and Vy (P1') is the amount of the virtual color material y at the point P1'. Further, L is the distance between the point P1 and the point P1' on the RGB color space and x is the distance between the point P1 and the point P1" on the RGB color space.

Next, at step 517, the virtual color material amount inside the color cube is derived. In the present embodiment, the color cube shown in FIG. 8 is divided into tetrahedrons and the virtual color material amount inside the tetrahedron is calculated for each of the divided tetrahedrons. FIG. 10A to FIG. 10F show six tetrahedrons including the above-described K-W line, respectively. The virtual color material amounts on the two planes including the W-K line of the four planes making up each tetrahedron are already derived at step 516. In the present embodiment, the planes the virtual color material amounts on which are already derived are connected by a line parallel to one of the RGB axes. Then, for each connected line, the virtual color material amount is found by a higher-order function or publicly known interpolation processing, such as linear interpolation, and thus the virtual color material amount inside the tetrahedron is calculated. Here, specific explanation is given by taking the case of FIG. 10A as an example. In the tetrahedron (tetrahedron W-C-K-B surrounded by plane W-C-K, plane W-B-K, plane W-C-B, plane C-B-K) shown in FIG. 10A, the virtual color material amounts on the two planes including the vertex W and the vertex K, that is, a plane W-C-K and a plane W-B-K are already derived at step 516. At this time, in order to derive a virtual color material amount V (Q1") at a point Q1" inside the tetrahedron W-C-K-B, first, a virtual color material amount V (Q1) at an intersection Q1 of a line passing the point Q1" and parallel to the G-axis, and the plane W-C-K is acquired. Similarly, a virtual color material amount V (Q1') at an intersection Q1' of the line passing the point Q1" and parallel to the G-axis, and the plane W-B-K is acquired. Then, from the acquired two virtual color material amounts V (Q1) and V (Q1'), the virtual color material amount V (Q1") at the point Q1" is derived by a higher-order function, interpolation processing, and so on. For example, in the case where V (Q1") is calculated by linear interpolation, it may be possible to use expression (6") below.

$$V(Q1")=V(Q1)+(V(Q1')-V(Q1))\times x/L \qquad \text{expression (6")}$$

In expression (6") described above, L is the distance between the point Q1 and the point Q1' on the RGB space and x is the distance between the points Q1 and Q1' on the RGB space.

In the explanation of the derivation of the virtual color material amount inside the tetrahedron, for simplification of explanation, the description of the three virtual color materials of the virtual color material amounts is omitted. In each virtual color material, calculation is performed by the above-described procedure. The above is the contents of the virtual color material amount derivation processing.

<Target Number of Dots Setting Processing>

Figure 11B:
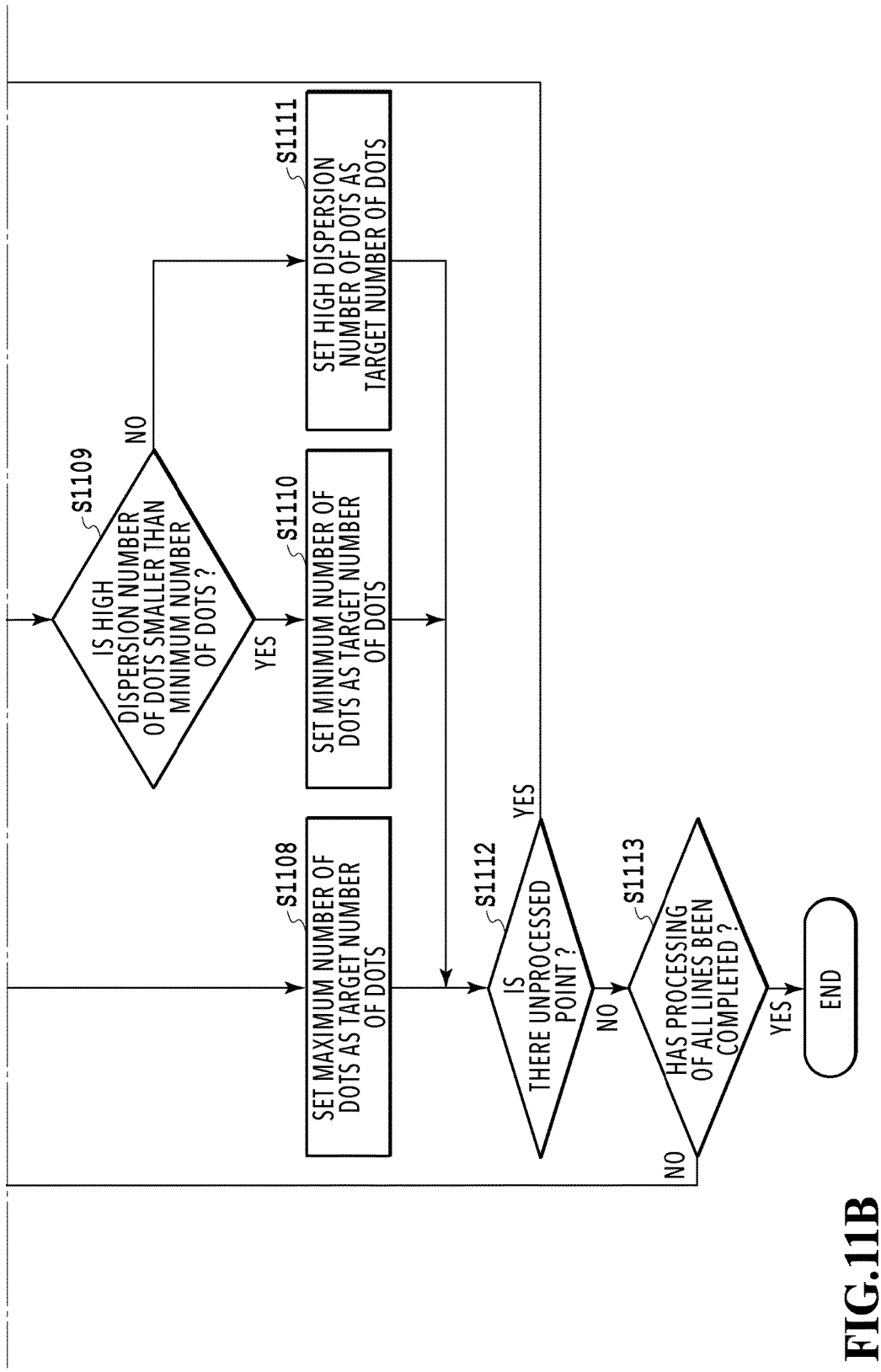
FIG. 11B is a flowchart showing details of setting processing of a target number of dots according to a first embodiment.

FIG. 11 is a flowchart showing details of the target number of dots setting processing at step 302. In this processing, the target value of the number of dots, that causes a dot pattern after the dither processing using a dither matrix to become high dispersion at many tone levels. In the dither matrix, a dot pattern corresponding to each tone level is determined in advance. By taking into consideration dispersibility of a dot pattern that is output in the case where image data of a certain uniform tone level is converted by using the dither matrix, the arrangement of threshold values in the dither matrix is designed. However, it is not necessarily possible to output a dot pattern of high dispersion for all the tone levels. Consequently, by setting the number of dots that causes a dot pattern to become high dispersion at the time of performing dither processing using the dither matrix as a target value, it is possible to obtain a color conversion LUT that enables printing excellent in granularity. In the following, explanation is given along the flow in FIG. 11.

First, at step 1101, from the lines connecting vertexes described previously, a line on which attention is focused and which is taken to be a processing target is determined. Here, explanation is given on the assumption that the W-K line is selected.

Figure 12:
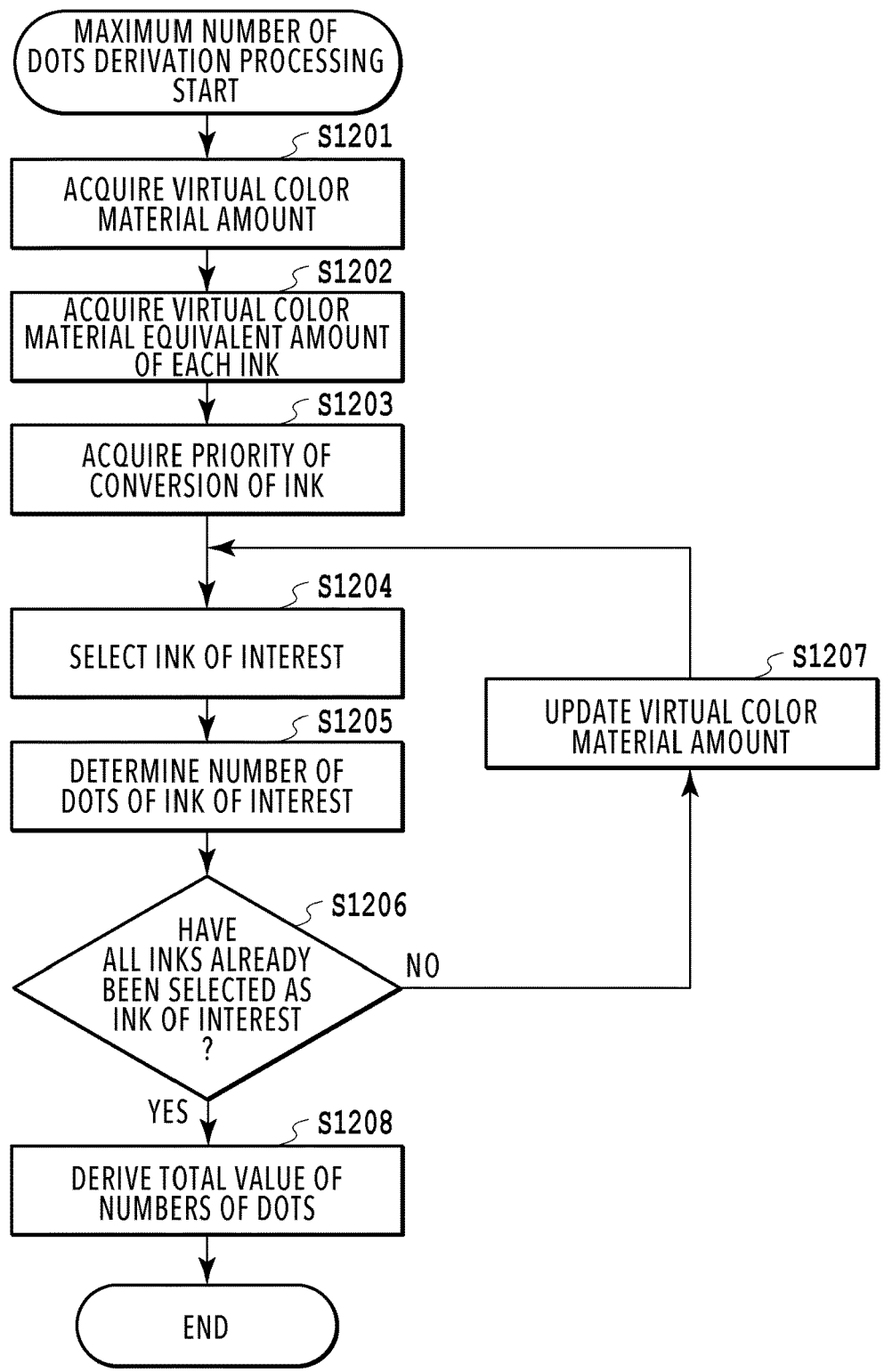
FIG. 12 is a flowchart showing details of calculation processing of a maximum number of dots.

Next, at step 1102, the maximum number of dots of the ink amount (corresponding to all the ink colors) on the line of interest determined at step 1101 is derived. In the following, calculation of the maximum number of dots is explained along another flow shown in FIG. 12.

First, at step 1201, the virtual color material amount that is the source of conversion found by the virtual color material amount derivation processing described previously is acquired. Here, it is assumed that the virtual color material amount corresponding to the W-K line is acquired.

Next, at step 1202, the virtual color material equivalent amount per dot of each ink (calculated at step 505 of the flow in FIG. 5 described previously) is acquired. Then, at step 1203, the priority of conversion of ink is set. Specifically, the maximum value (or average value) of each of the virtual color material equivalent amounts Vy', Vm', and Vc' per dot of ink, which are acquired at step 1202, is acquired and priority is set so that the ink whose maximum value (average value) is smaller is given higher priority of conversion. In the present embodiment, priority is set in the order of gray, light cyan, light magenta, yellow, cyan, magenta, and black from the highest priority. By setting the priority of conversion as described above, the conversion into the ink whose density is low is performed with priority, and therefore, color conversion excellent in granularity with a large number of dots is obtained.

Next, at step 1204, an ink color on which attention is focused is selected from all the ink colors in accordance with the priority of conversion of ink set at step 1203. Then, at step 1205, the number of dots of the selected ink of interest is determined. Specifically, the number of dots of the ink of interest is determined so that at least one of the virtual color material amounts Vc, Vm, and Vy for the ink of interest coincides with the virtual color material amount that is the source of conversion acquired at step 1201. At this time, the virtual color material amounts Vc, Vm, and Vy for the ink of interest are calculated based on the virtual color material equivalent amounts Vy', Vm', and Vc' per dot of the ink of interest.

Next, at step 1206, whether or not all the inks used in the printer 20 have already been selected as the ink of interest is determined. In the case where all the inks have already been selected as the ink of interest, the processing advances to step 1208. On the other hand, in the case where an ink that has not been selected yet as the ink of interest exists, the processing advances to step 1207.

At step 1207, the virtual color material amount that is the source of conversion is updated. Specifically, a new virtual color material amount that is the source of conversion is set by subtracting the virtual color material amount corresponding to the number of dots of the ink of interest determined at step 1205 (value obtained by multiplying the number of dots of the ink of interest and the virtual color material equivalent amount per dot of the ink of interest) from the current virtual color material amount that is the source of conversion. After the virtual color material amount that is the source of conversion is updated, the processing returns to step 1204, and the next ink of interest is selected and the processing is continued.

Lastly, at step 1208, the total value of the numbers of dots determined for all the inks is calculated and the calculated total value is determined to be the maximum number of dots. At this time, for example, in the case where the maximum number of dots on the W-K line is calculated, on a condition that the target virtual color material amount increases linearly from W toward K, the calculation results will also be linear. At the time of calculation of the maximum number of dots, the limit to the applied material amount is ignored. The above is the contents of the maximum number of dots calculation processing. Explanation is returned to the flow in FIG. 11.

At step 1103, the minimum number of dots of the ink amount (corresponding to all the ink colors) on the line of interest determined at step 1101 is calculated. It may be possible to perform the calculation in this case in accordance with the calculation of the maximum number of dots described above. At that time, in setting the priority of conversion of ink (step 1203 of the flow in FIG. 12), the priority is set so that the larger the total value (or average value) of the virtual color material equivalent amounts Vy', Vm', and Vc' per dot, the higher the priority is. Here, the reason the larger the "maximum value", the higher the priority is not set is that the number of dots does not necessarily become minimum in this case. For example, it is supposed that the virtual color material equivalent amount of each ink of cyan, magenta, yellow, and black is as follows in the case where the target virtual color material amount (Vy, Vm, Vc)=(11, 11, 11)[%].

cyan: (Vy',Vm',Vc')=(0,0,1.1)[%]

magenta: (Vy',Vm',Vc')=(0,1.1,0)[%]

yellow: (Vy',Vm',Vc')=(1.1,0,0)[%]

black: (Vy',Vm',Vc')=(1,1,1)[%]

In this case, on a condition that higher priority is set for the larger maximum value, priority is given to cyan, magenta, and yellow over black. Then, the number of dots of each of cyan, magenta, and yellow inks is ten, respectively, and therefore, 30 dots in total. In contrast to this, in the case where the black ink is used, only 11 dots are necessary, and therefore, the total value (or average value) is used, not the maximum value. In the present embodiment, priority is set in the order of black, magenta, cyan, yellow, light magenta, light cyan, and gray from the highest priority. By setting the priority of conversion in this manner, the conversion into the ink whose density is high is performed with priority, and therefore, color conversion that suppresses ink consumption with a small number of dots is obtained.

Next, at step 1104, a limit number of dots (limit value of the applied material amount indicating the total amount of ink) per unit area that a printing medium can absorb is acquired. This limit number of dots is given in advance by a designer. For example, a plurality of patches whose number of dots is different from one another is output by the printer 20 and a designer finds the number of dots a printing medium can absorb sufficiently and determines and stores the limit number of dots in the storage unit. Alternatively, it may also be possible to prepare a table in which information relating to the ink reduction amount, the printing speed, and the number of printing passes is described for each printing medium, or a calculation expression and to determine the limit number of dots each time according to the printing medium to be used.

Figure 13:
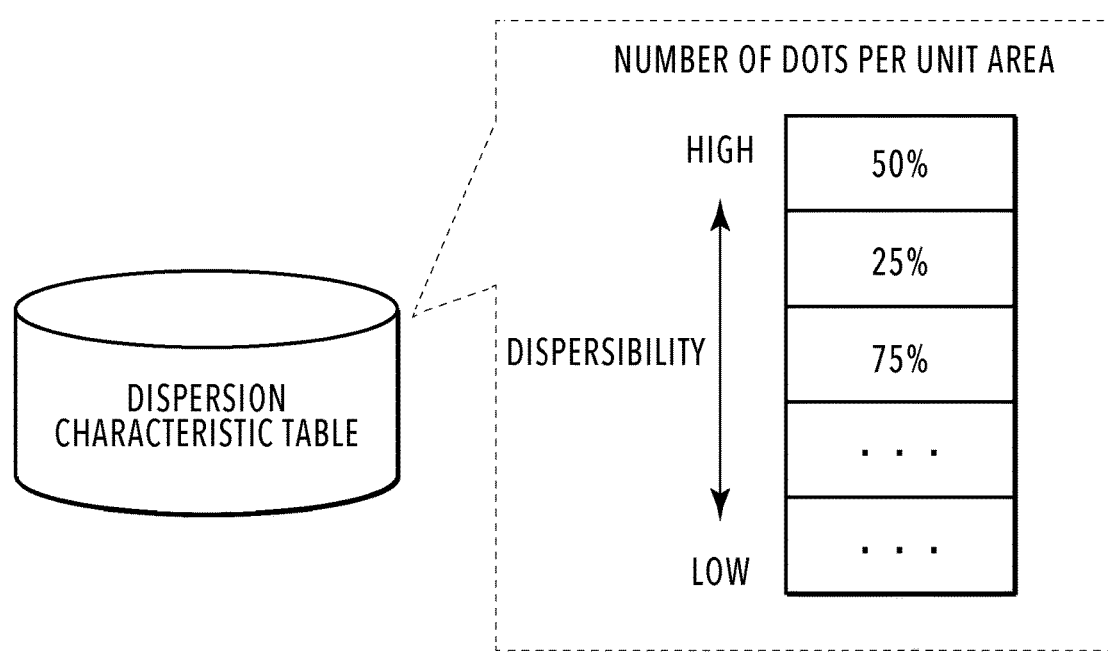
FIG. 13 is an example of a dispersion characteristic table.

Next, at step 1105, the number of dots (hereinafter, high dispersion number of dots) that causes the dot pattern after dither processing to become high dispersion is acquired based on the dispersion characteristic table 33 described previously. It is possible to obtain the dispersion characteristic table 33 by analyzing the relationship between the number of dots and dispersibility of a dot pattern from, for example, the printing results of a plurality of kinds of halftone image corresponding to the different numbers of dots. That is, the numbers of dots by which the results of high dispersion can be obtained are specified by the analysis, and a table in which the numbers of dots are arranged in the order from the number of dots whose dispersibility is the highest is created and stored. FIG. 13 is a diagram showing an example of the dispersion characteristic table and it is known that the relationship between dispersibility and the number of dots is specified. Further, it is already known that dispersibility is high with the number of dots corresponding to the initial dither pattern in the case where the dither matrix is generated by the already-known Void-and Cluster method and the like, and therefore, such information may be stored as a table. In this case, analysis and the like will be no longer necessary. At this step, by using the dispersion characteristic table as shown in FIG. 13, the numbers of dots that satisfy all the conditions below and whose dispersion is the highest are searched for in the order from the top and the number of dots that satisfies the conditions for the first time is acquired as the high dispersion number of dots.

smaller than or equal to the maximum number of dots calculated at step 1102 larger than or equal to the minimum number of dots calculated at step 1103 not exceeding the limit number of dots acquired at step 1104

For example, it is assumed that the virtual color materials (Vy, Vm, Vc) of W and K are (0, 0, 0) and (90, 85, 80)[%], respectively, and the virtual color materials per dot of the black ink and the gray ink are (1.5, 1.42, 1.33)[%] and (0.6, 0.57, 0.53)[%], respectively. Then, in the case where the maximum number of dots changes linearly between 0 and 150%, the minimum number of dots changes linearly between 0 and 60%, and the limit number of dots is 100% and constant, the high dispersion number of dots is 50% and constant.

Then, at step 1106 to step 1113 that follow, the target number of dots at each point on the line of interest is set.

First, at step 1106, a point on which attention is focused on the line of interest is determined. At this time, the order of determining the point of interest is not limited, and for example, in the case of the W-K line, it may also be possible to determine the point of interest from W toward K in order, or to determine in the opposite order thereof. Then, at step 1107, for the determined point of interest, whether the high dispersion number of dots is larger than the maximum number of dots at the point of interest is determined. In the case where the high dispersion number of dots is larger than the maximum number of dots, the processing advances to step 1108 and the maximum number of dots is set as the target number of dots. On the other hand, in the other cases (in the case where the high dispersion number of dots is smaller than or equal to the maximum number of dots), the processing advances to step 1109.

At step 1109, whether the high dispersion number of dots acquired at step 1105 is smaller than the minimum number of dots at the point of interest is determined. In the case where the high dispersion number of dots is smaller than the minimum number of dots, the processing advances to step 1110 and the minimum number of dots is set as the target number of dots. On the other hand, in the other cases (in the case where the high dispersion number of dots is larger than or equal to the minimum number of dots), the processing advances to step 1111 and the high dispersion number of dots is set as the target number of dots.

Then, at step 1112, whether the target number of dots has been set for all the points on the line of interest is determined. In the case where there is an unprocessed point on the line of interest, the processing returns to step 1106, and the next point of interest is determined and the processing is continued. On the other hand, in the case where the target number of dots has been set for all the points, the processing advances to step 1113.

Lastly, at step 1113, whether the processing of all the lines has been completed is determined. In the case where there is an unprocessed line, the processing returns to step 1101, and the next line is determined to be the line of interest and the processing is continued. On the other hand, in the case where the processing of all the lines has been completed, this processing is terminated. The above is the contents of the target number of dots setting processing.

Figure 14A:
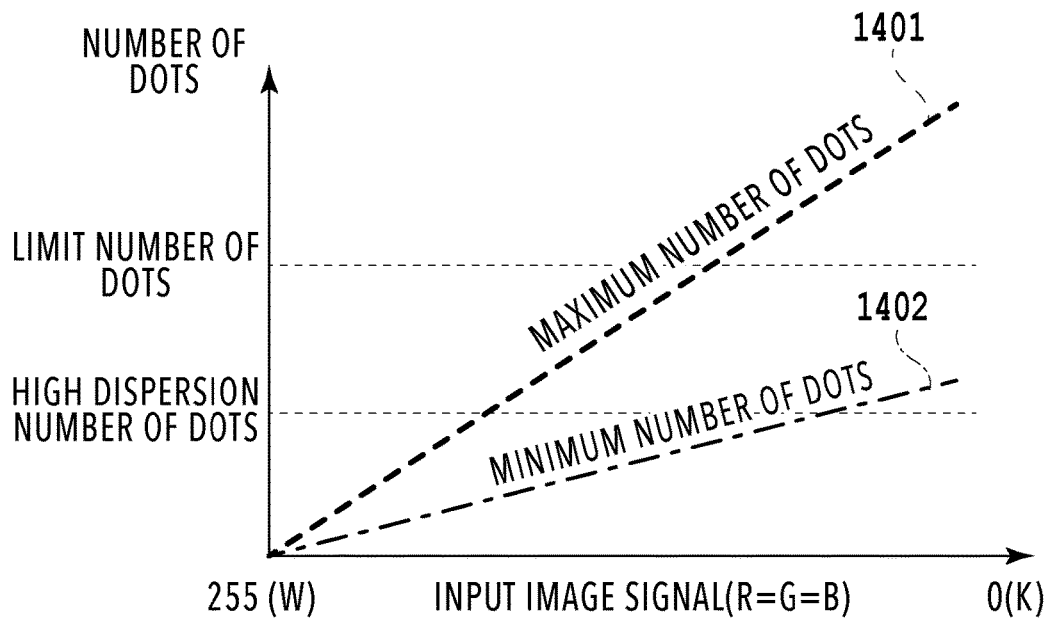
FIG. 14A and FIG. 14B are examples of results of performing setting processing of a target number of dots of the first embodiment.
Figure 14B:
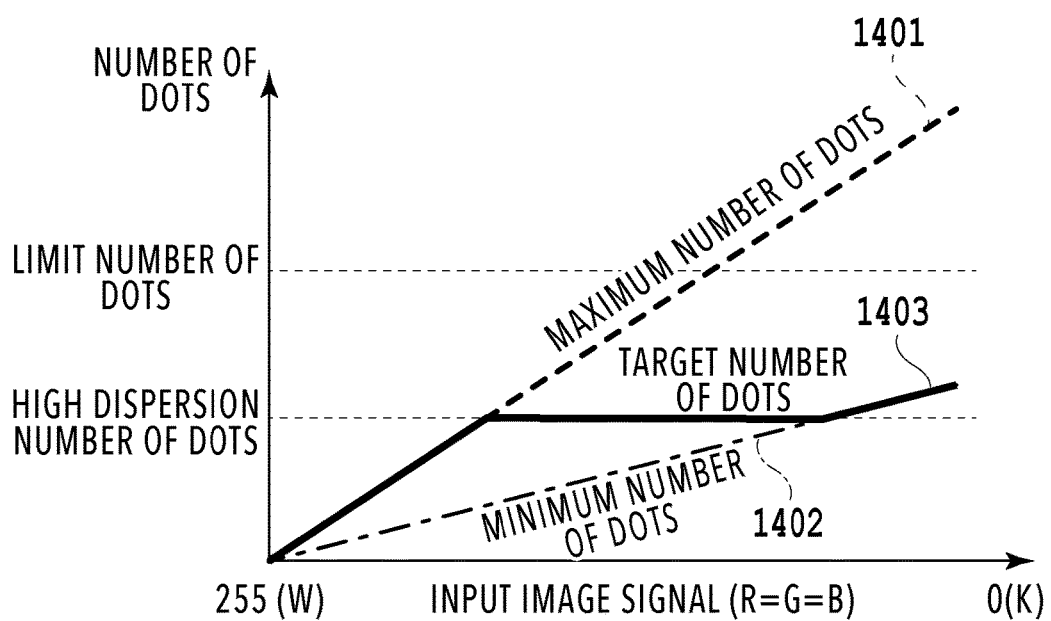

FIG. 14A and FIG. 14B are each a diagram showing an example of the results of performing the target number of dots setting processing for each point of interest on the W-K line. FIG. 14A is the results obtained by the processing up to step 1105. In this example, the maximum number of dots (0 to 150%) on the W-K line is indicated by a dotted line 1401 and the minimum number of dots (0 to 60%) is indicated by a one-dot chain line 1402, respectively. Further, as described above, the high dispersion number of dots is 50% and constant and the limit number of dots is 100% and constant. Then, FIG. 14B is the results obtained after completion of all steps and the target number of dots set for the W-K line is indicated by a thick solid line 1403. From FIG. 14B, the following fact is known. First, in the highlight area, the maximum number of dots does not reach the high dispersion number of dots. In this case, by setting the target number of dots and the maximum number of dots to the same number, it is possible to cause the maximum number of dots to reach the high dispersion number of dots in the shortest time. Further, in the shadow area, the minimum number of dots is larger than the high dispersion number of dots. In this case, by setting the target number of dots and the minimum number of dots to the same number, it is possible to minimize ink consumption. By setting the target number of dots as described above, it is possible to make the most use of a dot pattern of high dispersion in a wide gradation range.

The target number of dots setting processing described above is also performed on the plane surrounded by lines connecting vertexes. Due to this, the target number of dots on each plane is set. At this time, it is sufficient to perform processing as in the case of step 516 (calculation of the virtual color material amount on the plane surrounded by lines connecting vertexes). That is, by making up a plane surrounded by lines connecting vertexes by a plurality of lines and by applying the target number of dots setting processing to each line, the target number of dots on the plane is set. Further, the same processing is performed also for the inside of the color cube. Due to this, the target number of dots inside the color cube is set. At this time, by dividing the color cube into tetrahedrons, making up the inside of the tetrahedron by a plurality of lines for each divided tetrahedron, and applying the target number of dots setting processing on the line to each line, the target number of dots inside the color cube is set.

<Conversion Processing into Actual Color Material Amount>

Figure 15:
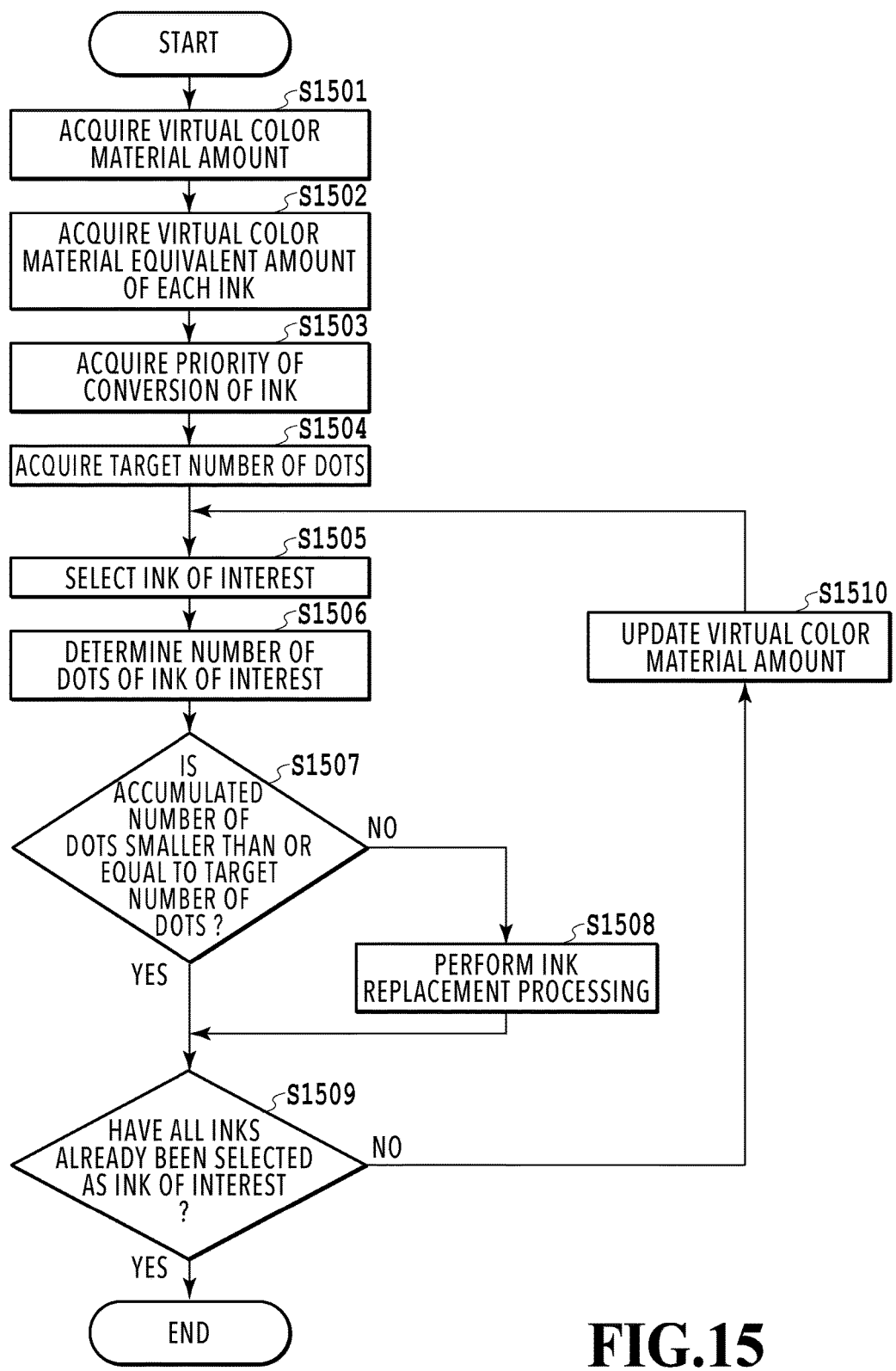
FIG. 15 is a flowchart showing details of conversion processing from a virtual color material amount into an actual color material amount.

FIG. 15 is a flowchart showing details of the conversion processing from a virtual color material amount into an actual color material amount at step 303. In this processing, a color conversion LUT is created by deriving the ink amount of all the ink colors corresponding to all the input RGB signals based on the target number of dots set at step 302. In the following, explanation is given along the flow in FIG. 15.

First, at step 1501, the virtual color material amounts Vy, Vm, and Vc that are the source of conversion derived at step 301 are acquired. At step 1502 that follows, the virtual color material equivalent amount per dot of the actual color material (ink) found at step 505 is acquired. Next, at step 1503, the priority of conversion of each ink used in the printer 20 is acquired. This priority of conversion is set so that the ink whose density is lower is given higher priority. Specifically, it is sufficient to acquire the maximum value of the virtual color material equivalent amount per dot of each ink acquired at step 1502 and to set the priority so that the ink whose maximum value is lower is given higher priority. For example, the priority of conversion is gray, light cyan, light magenta, yellow, cyan, magenta, and black from the highest priority. In the case where the priority of conversion is set as described above, the conversion into the ink whose density is low is performed with priority, and therefore, it is possible to implement color conversion excellent in granularity. Then, at step 1504, the target numbers of dots (target numbers of dots of all the lines connecting vertexes of the color cube, all the planes surrounded by the lines, and all the insides of the color cube) set at step 302 are acquired.

Next, at step 1505, in accordance with the priority of conversion acquired at step 1503, an ink on which attention is focused is selected from all the inks. That is, of the inks used in the printer 20, the ink that is not selected yet as the ink of interest and whose priority is the highest is determined as the ink of interest. In the present embodiment, as the first ink of interest, gray (GY) is selected.

At step 1506 that follows, the number of dots of the ink of interest selected at step 1504 is determined. At this time, the number of dots of the ink of interest is determined so that at least one of the virtual color material amounts Vc, Vm, and Vy coincides with the virtual color material amount that is the source of conversion acquired at step 1501. Specifically, the maximum value of the virtual color material equivalent amounts Vy', Vm', and Vc' per dot of the ink of interest i is acquired and the number of dots that causes the virtual color material equivalent amount having the maximum value to coincide with the virtual color material amount that is the source of conversion is determined as a number of dots Ni of the ink of interest i. For example, in the case where Vy'>Vm' and Vm'>Vc', Ni_y corresponding to Vy' whose virtual color material equivalent amount is the largest is determined to be the number of dots Ni of the ink of interest i. By doing so, the amount of the main virtual color material of the ink of interest i (in the case where the ink of interest is the yellow ink, the virtual color material amount Vy) coincides with the virtual color material amount that is the source of conversion. By doing so, in the case where a plurality of main virtual color materials exists as in the black ink, it is possible to determine the number of dots by taking each virtual color material amount into consideration.

Next, at step 1507, whether the accumulated value (accumulated number of dots) of the number of dots determined for the ink of interest is within the range of the target number of dots acquired at step 1504 is determined. Specifically, an accumulated number of dots Sum_N, which is the sum of the numbers of dots determined up to the present point in time, and a target number of dots Target_N are compared and whether the accumulated number of dots Sum_N is smaller than or equal to the target number of dots Target_N is determined. In the case where the results of the determination indicate that the accumulated number of dots Sum_N is smaller than or equal to the target number of dots Target_N, the processing advances to step 1509. On the other hand, in the case where the accumulated number of dots Sum_N is larger than the target number of dots Target_N, the processing advances to step 1508.

At step 1508, ink replacement processing is performed. Specifically, processing to convert the ink whose priority of conversion is high into the ink whose priority is lower and which exhibits substantially the same hue is performed so that the accumulated number of dots Sum_N and the target number of dots Target_N become equal to each other. At this time, the replacement is performed so that the virtual color material amount before the replacement substantially coincides with that after the replacement. By this ink replacement processing, for example, the gray ink whose priority is high is replaced with the black ink whose priority is low and which exhibits substantially the same hue. By this, the area in which ink is applied with the target number of dots is widened.

At step 1509, whether or not all the inks used in the printer 20 have already been selected as the ink of interest is determined. In the case where all the inks have already been selected as the ink of interest, this processing is terminated. On the other hand, in the case where an ink that has not been selected yet as the ink of interest exists, the processing advances to step 1510.

At step 1510, the virtual color material amount that is the source of conversion is updated. Specifically, a new virtual color material amount that is the source of conversion is set by subtracting the virtual color material amount corresponding to the number of dots of the ink of interest determined up to the ink replacement processing (value obtained by multiplying the number of dots of the ink of interest and the virtual color material equivalent amount per dot of the ink of interest) from the current virtual color material amount that is the source of conversion. The virtual color material amount after the updating thus obtained is used as the virtual color material amount that is the source of conversion, which is the target of coincidence, in the processing for the next ink of interest i.

Figure 16:
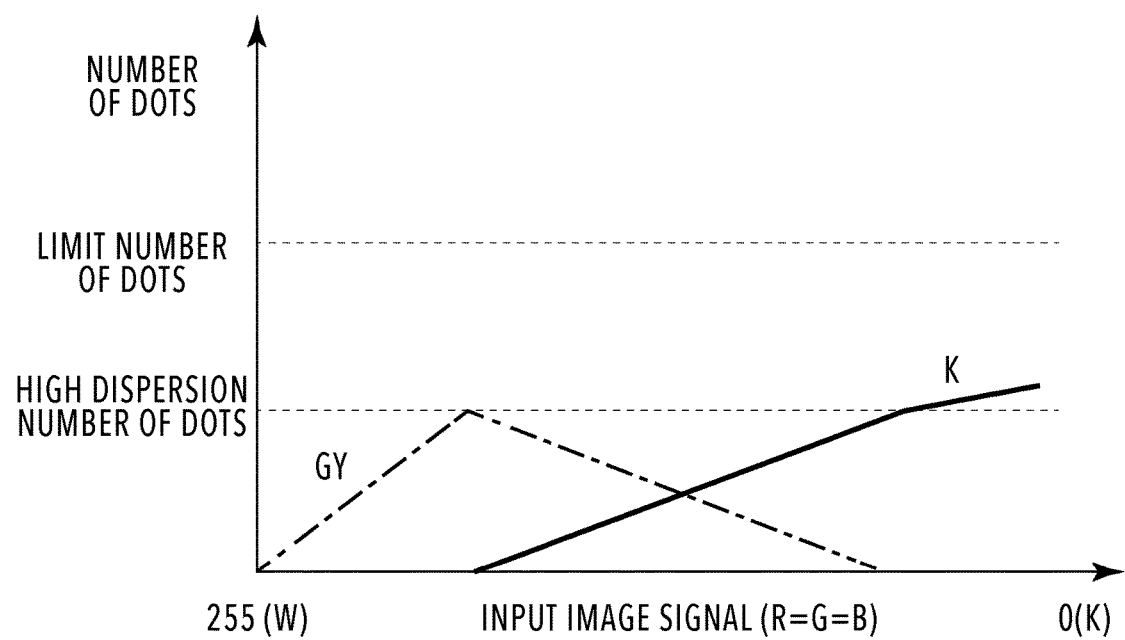
FIG. 16 is a part of a created color conversion LUT (W-K line)

The above is the contents of the conversion processing from the virtual color material amount into the actual color material amount. As described above, from the virtual color material amount corresponding to each input RGB signal value of the color conversion LUT, the actual color material amount (number of dots corresponding to the ink amount) of each ink color is found and the color conversion LUT that associates each input RGB signal and the number of dots with each other is created. FIG. 16 shows a part (W-K line) of the color conversion LUT obtained by applying this processing. It is known from FIG. 16 that the high dispersion number of dots is reached in the shortest time by using only the gray ink in the highlight area. Further, in the intermediate area, the total number of dots and the high dispersion number of dots become equal to each other by decreasing the gray ink and increasing the black ink instead. Further, it is known that ink consumption is reduced by using only the black ink in the shadow area. The example in FIG. 16 premises that the ratio between the virtual color material equivalent amount of the gray ink and that of the black ink is 1:2.

In the case where color conversion processing is performed by using the color conversion LUT thus created, the high dispersion number of dots is made the most use of in the wide gradation range, and therefor, it is possible to perform printing excellent in granularity. Further, by decreasing the number of dots of the gray ink before the limit number of dots is reached, it is also possible to reduce ink consumption.

(Dither Processing)

Figure 17:
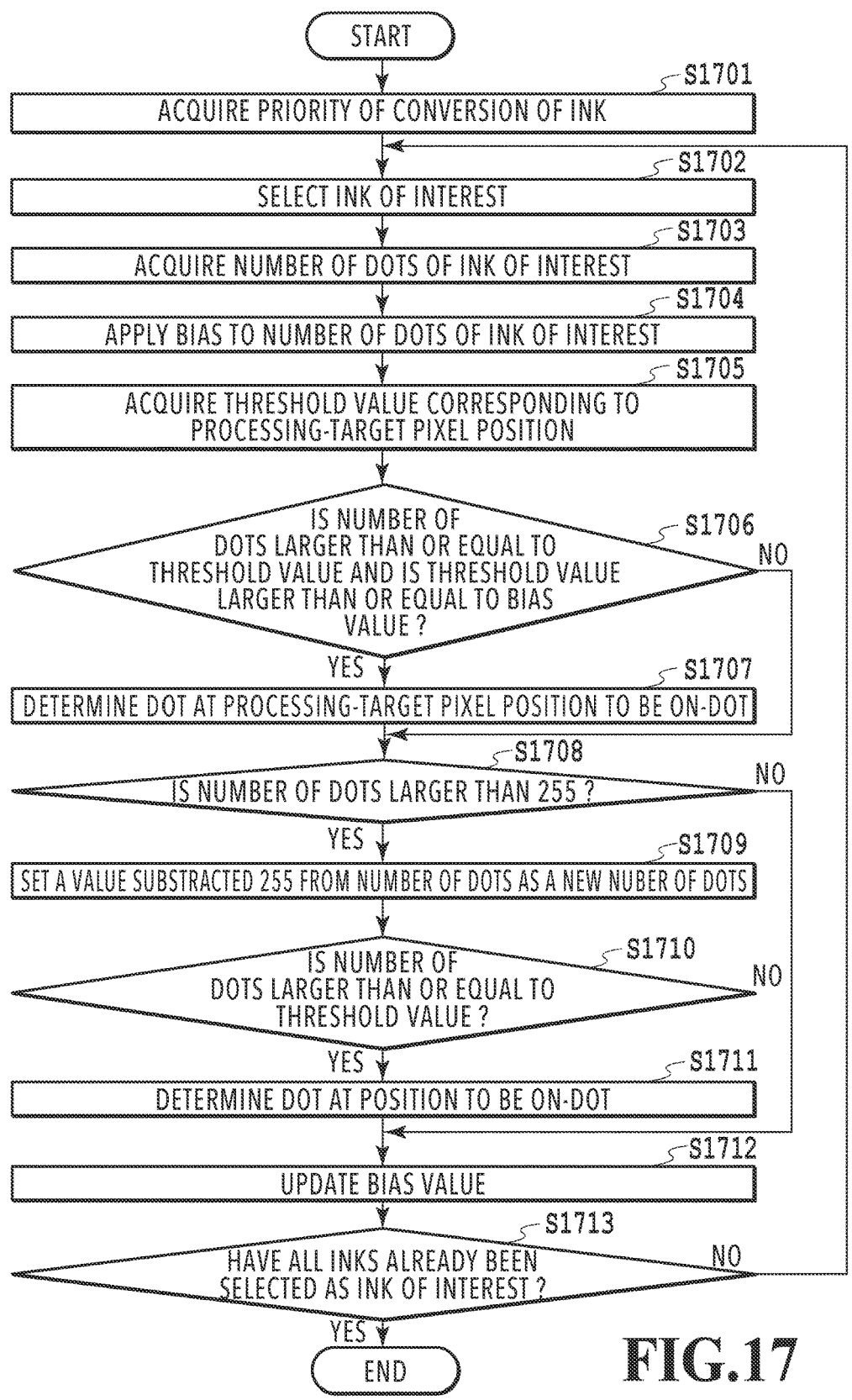
FIG. 17 is a flowchart showing a flow of dither processing.

Following the above, the dither processing at step 206 is explained. FIG. 17 is a flowchart showing a flow of the dither processing according to the present embodiment. In the following, along the flow in FIG. 17, detailed explanation is given. The following series of processing is performed for each pixel of the input color image data.

First, at step 1701, the priority of the ink color for which the dither processing is performed is acquired. In this case, it is assumed that the ink color that is visually conspicuous is given high priority. For example, to the ink color whose virtual color material equivalent amount per dot for each ink is larger, or to the ink color whose visual density for each ink is higher, higher priority is given. In the present embodiment, it is assumed that priority is in the order of black, magenta, cyan, yellow, light magenta, light cyan, and gray from the highest priority.

Next, at step 1702, an ink color on which attention is focused and which is taken to be a processing target is selected in accordance with the priority of conversion of ink acquired at step 1701. At step 1703 that follows, the number of dots in the processing-target pixel of the ink color of interest selected at step 1702 is acquired from the color conversion processing unit 13. Here, it is assumed that the number of dots that is acquired is normalized so that the maximum value becomes 255 in the case where the applied material amount is 100%. That is, after the RGB signal value of a color image for which the input color matching processing has been performed is converted into the number of dots (applied material amount)[%] of CMYK by referring to the color conversion LUT described above, the number of dots is normalized to eight bits (0 to 255) and the number of dots after the normalization is acquired.

Figure 18:
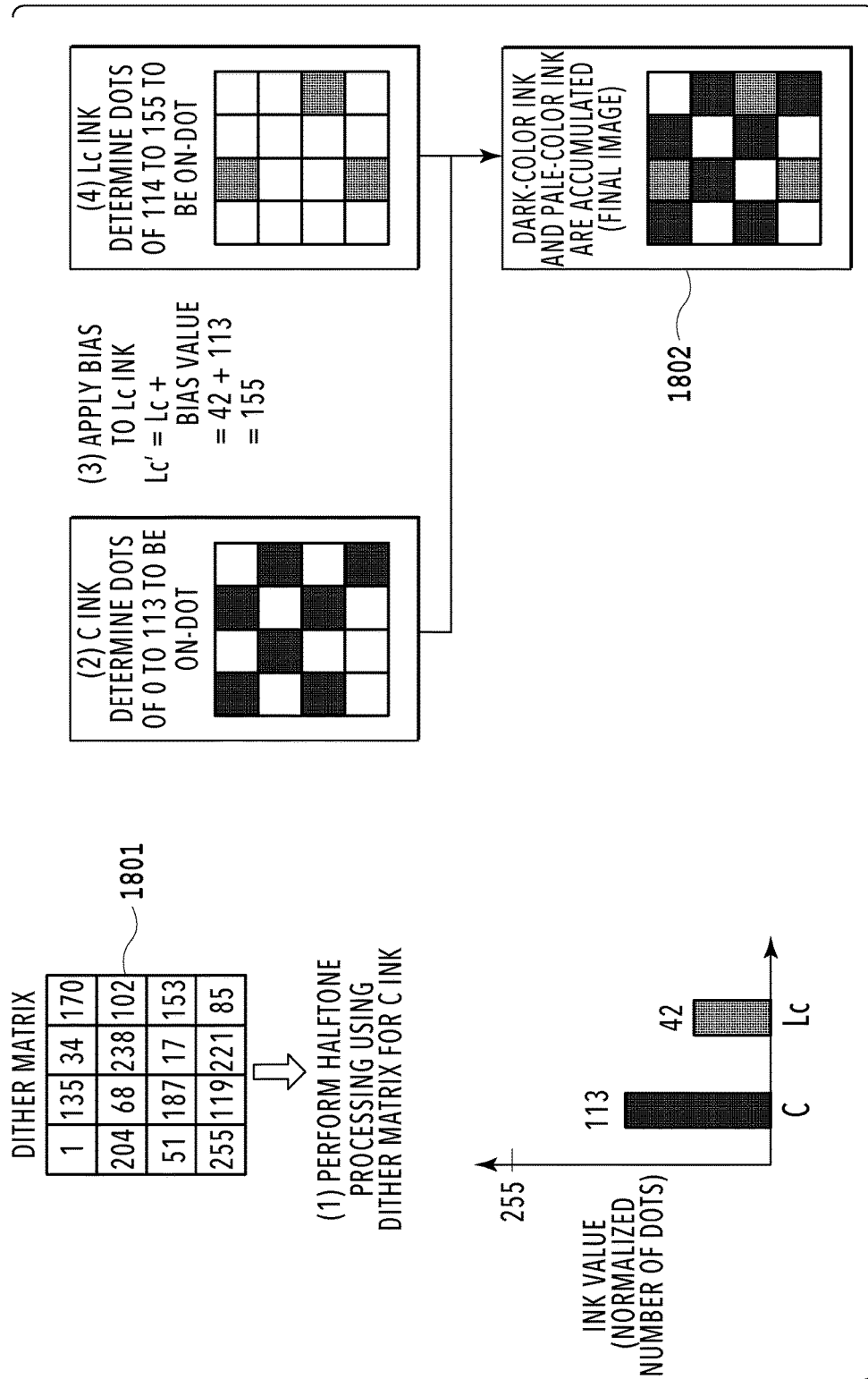
FIG. 18 is a diagram explaining a meaning of applying a bias to a normalized number of dots.

Next, at step 1704, a bias is applied to the number of dots (normalized number of dots) acquired at step 1703. Specifically, a bias value is added to the acquired normalized number of dots. The initial value of the bias value is 0. By applying a bias, it is made possible to use a threshold value matrix common to all the ink colors. Specific explanation is given by using FIG. 18. First, for the cyan plane whose priority is higher, the halftone processing using a dither matrix 1801 is performed. The normalized number of dots of the cyan ink is "113", and therefore, the pixel position corresponding to the threshold value "0 to 113" becomes the on-dot. Next, for the light cyan plane, the halftone processing using the same dither matrix 1801 is performed. At this time, the bias value "113" is added to the normalized number of dots "42" of the light cyan ink and the normalized number of dots "155" is used. Consequently, the pixel position corresponding to the threshold value "114 to 155" becomes the on-dot. In the case where the halftone image of the cyan plane and the halftone image of the light cyan plane thus obtained are combined, an image, such as a final image 1802, is obtained. By applying a bias as described above, it is possible to arrange the dot of the ink of interest at the empty portion of a dot pattern for which arrangement has already been performed.

Next, at step 1705, the threshold value at the position on the dither matrix corresponding to the position of the processing-target pixel is acquired by referring to the dither matrix 16. Then, at step 1706, whether the following two conditions are both satisfied is determined.

the current normalized number of dots is larger than or equal to the acquired threshold value the acquired threshold value is larger than or equal to the bias value In the case where the above-described two conditions are both satisfied, the processing advances to step 1707 and the processing-target pixel position is determined to be the on-dot. On the other hand, in the case where both the conditions are not satisfied, the processing advances to step 1708.

At step 1708, whether the current normalized number of dots exceeds the maximum value "255" thereof is determined. In the case where the current normalized number of dots exceeds "255", the processing advances to step 1709 and "255" is subtracted from the current normalized number of dots. In the case where the current normalized number of dots does not exceed "255", the processing advances to step 1712.

At step 1710, whether the current normalized number of dots is larger than or equal to the threshold value acquired at step 1705 is determined. In the case where the current normalized number of dots is larger than or equal to the threshold value, the processing advances to step 1711 and the processing-target pixel position is determined to be the on-dot. In the case where the current normalized number of dots is not larger than or equal to the threshold value, the processing advances to step 1712.

At step 1712, the bias value is updated. Specifically, the normalized number of dots is substituted for the current bias value and a new bias value is determined. Then, at step 1713, whether the processing has been performed for all the inks used in the printer 20 is determined. In the case where the processing has been completed for all the inks, this processing is terminated. On the other hand, in the case where there is an unprocessed ink, the processing returns to step 1702, and the next ink color is selected as the ink color of interest and the processing is continued. The above is the contents of the dither processing according to the present embodiment.

Figure 19A:
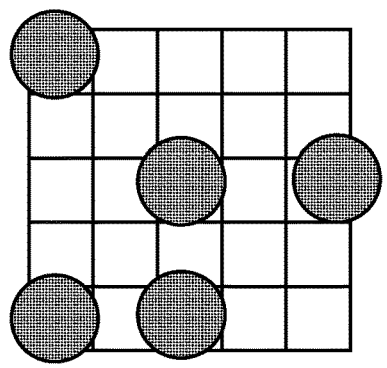
FIG. 19A to FIG. 19F are diagrams showing a dot forming process in the case where dither processing of the present embodiment is performed.
Figure 19B:
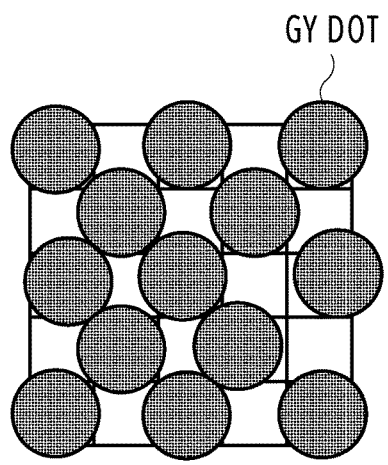
Figure 19C:
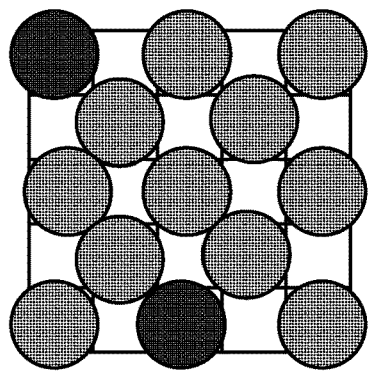
Figure 19D:
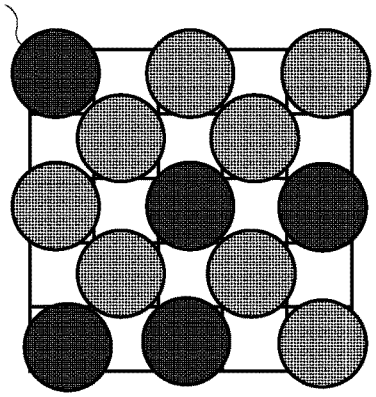
Figure 19E:
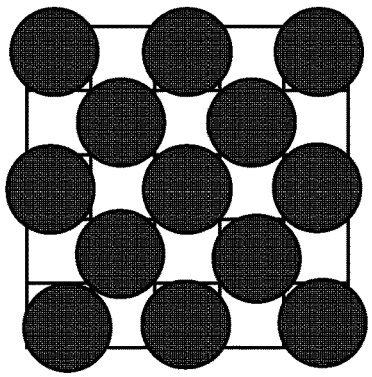
Figure 19F:
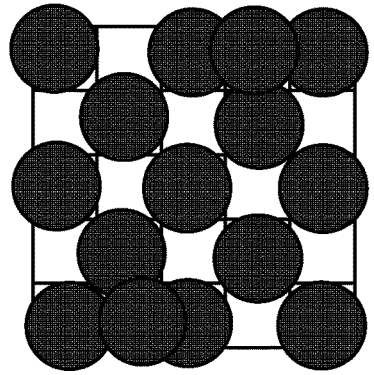

FIG. 19A to FIG. 19F are diagrams showing the dot formation process in the case where the dither processing is performed for the gradation patch of the W-K line. From the highlight area toward the shadow area, the on-dot is formed in the order from FIG. 19A to FIG. 19F. First, in the highlight area before the number of on-dots reaches the high dispersion number of dots, as shown in FIG. 19A and FIG. 19B, the dot pattern is formed by only the on-dots of the gray ink. Next, after the number of on-dots reaches the high dispersion number of dots, as shown in FIG. 19C and FIG. 19D, the on-dots of the gray ink and the on-dots of the black ink are used and adjustment is performed so that the ratio maintains the target number of dots. Due to this, it is possible to cause the dot pattern combining the on-dots of the gray ink and the on-dots of the black ink to become high dispersion. Further, for the ink whose density is high, the dots are arranged with priority, and therefore, arrangement is performed so that the dot pattern of the on-dots of the black ink more visually conspicuous than the on-dots of the gray ink also becomes high dispersion. Furthermore, in the shadow area, as shown in FIG. 19E and FIG. 19F, the dot pattern is formed by using only the on-dots of the black ink. Due to this, it is possible to suppress ink consumption.

Modification Example

In the above-described embodiment, by adjusting the ratio between the dark-color ink and the pale-color ink, the high dispersion number of dots is maintained, but it is also possible to obtain the same effect by adjusting the ratio between the large dot and the small dot. In this case, it may be possible to apply the above-described embodiment by taking the large dot to be the dark-color ink and small dot to be the pale-color ink. The ejection amount of ink is different between the large dot and the small dot, and therefore, it becomes difficult to specify the applied material amount limit value of ink by the number of dots. However, the area in which ink overflows on a printing medium is the high-density (shadow) area in which the large dots are used mainly, and therefore, it is sufficient to specify the applied material amount limit value by the number of large dots (maximum ejection amount).

Figure 20A:
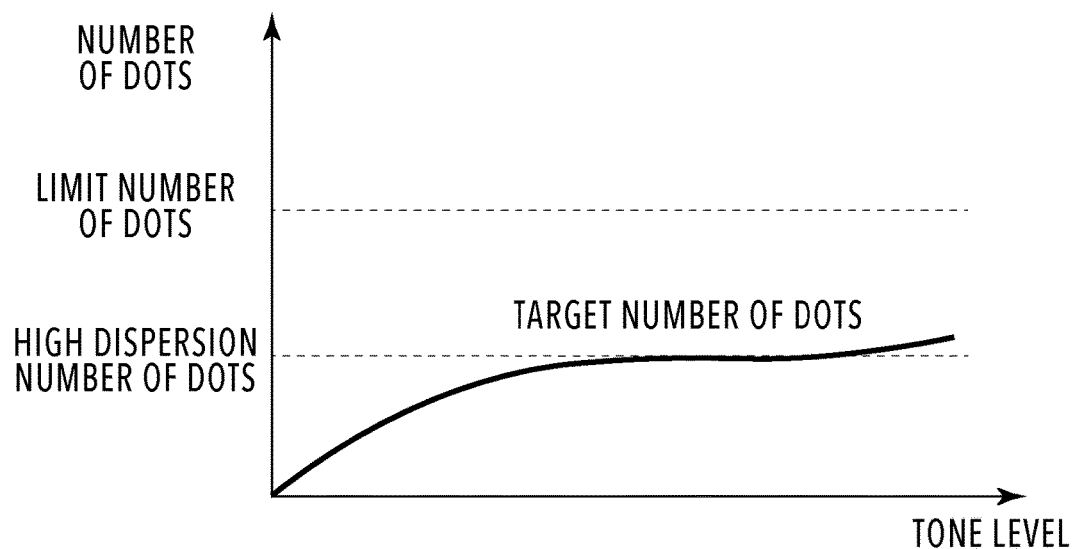
FIG. 20A and FIG. 20B are explanatory diagrams of a modification example of the first embodiment.
Figure 20B:
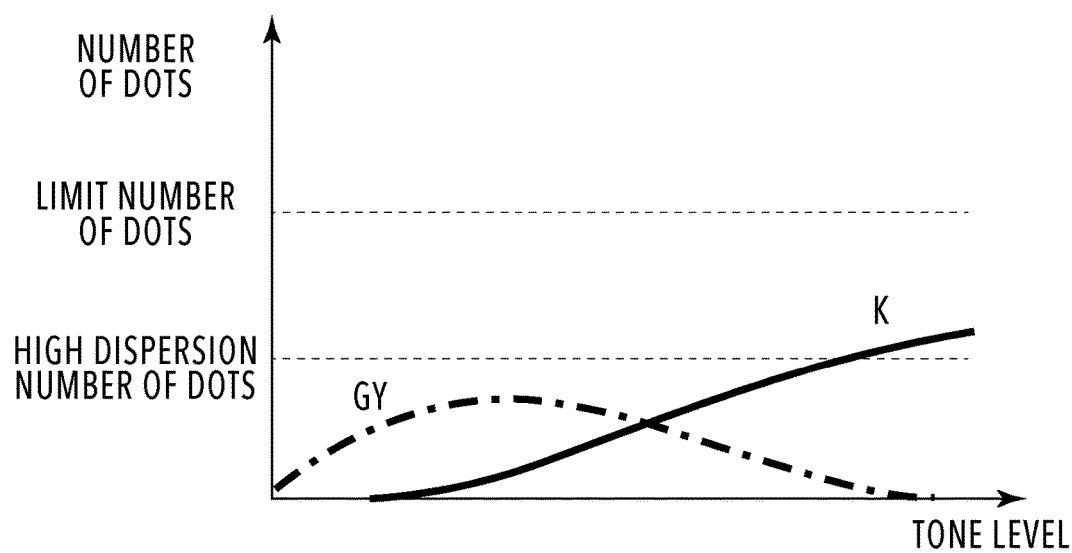

Further, in the above-described embodiment, the target number of dots is set so that the number of high dispersion areas becomes as large as possible. In this case, it is made possible to create a color conversion LUT excellent in granularity, but on the other hand, the dark-color ink and the pale-color ink switch suddenly, and therefore, the portion at which the dark-color ink and the pale-color ink switch becomes conspicuous to the eye and there is concern about deterioration of gradation properties. Consequently, it may also be possible to set smooth the point of inflection of the target number of dots of each line as shown in FIG. 20A. As a method of smoothing the point of inflection, there is an already-known method in which the convolution operation of the Gaussian filter is performed for the target number of dots of each line. Due to this, as shown in FIG. 20B, it is possible to make smooth switching between the dark-color ink and the pale-color ink and deterioration of gradation properties is suppressed.

Further, in the above-described embodiment, all the inks used in the printer 20 are taken to be the target, but it may also be possible to take only a part of the inks to be the target. In such a case, it may be possible to use the number of dots of another ink for which subtraction is performed as the limit number of dots or to perform the dither processing by performing subtraction for the normalized number of dots of another ink.

Second Embodiment

Next, an aspect is explained as a second embodiment in which the target number of dots is set stepwise in detail at the time of creating a color conversion LUT in the color conversion LUT creation apparatus 30. Explanation of the contents in common to those of the first embodiment is omitted or simplified and in the following, different points are explained mainly.

Figure 21B:
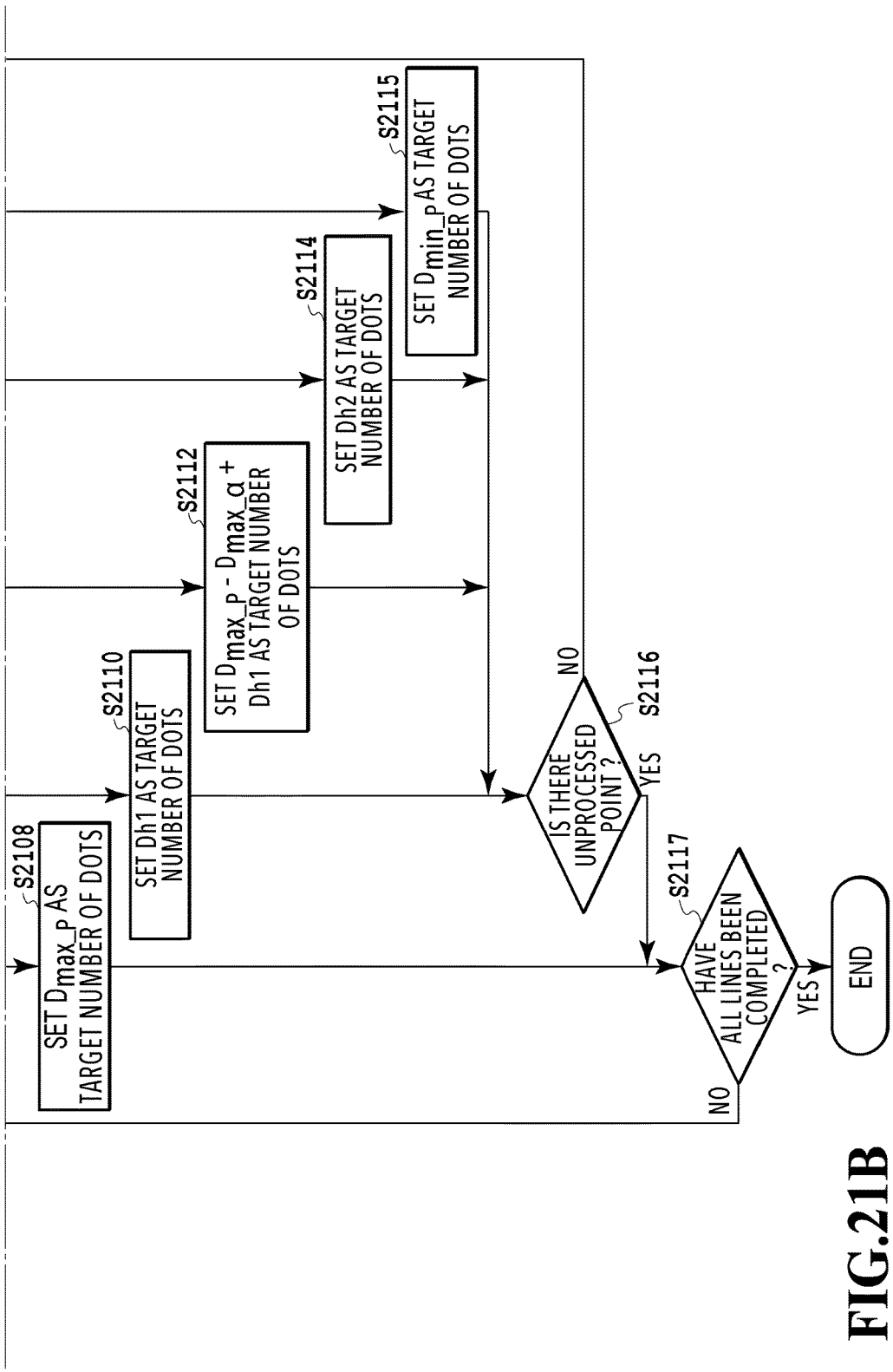
FIG. 21B is a flowchart showing details of setting processing of a target number of dots according to a second embodiment.

FIG. 21 is a flowchart showing details of the target number of dots setting processing at step 302 according to the present embodiment. Each piece of processing at step 2101 to step 2104 corresponds to each piece of processing at step 1101 to step 1104 in the flow in FIG. 11 of the first embodiment. That is, first, from the lines connecting vertexes described previously, a line on which attention is focused and which is taken to be a processing target is determined (step 1201) and next, for the ink amount corresponding to all the ink colors on the determined line of interest, the maximum number of dots and the minimum number of dots are calculated (steps 2102 and 2103). Then, the limit number of dots indicating the acceptable number of dots is acquired (step 2104).

Figure 22A:
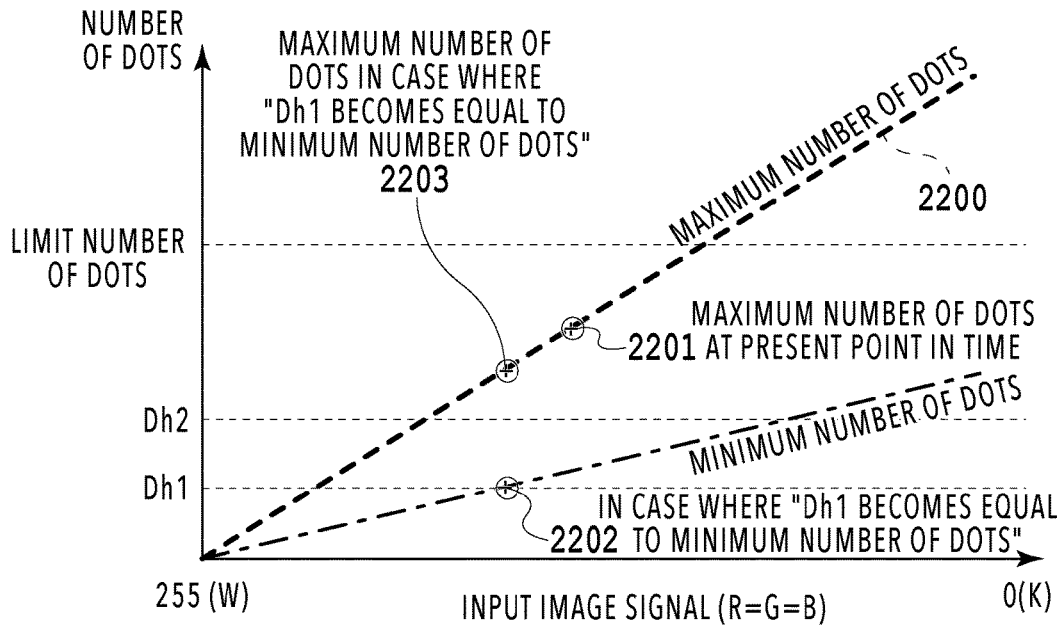
FIG. 22A and FIG. 22B are diagrams showing an outline of processing at step 2111 and step 2112.
Figure 22B:
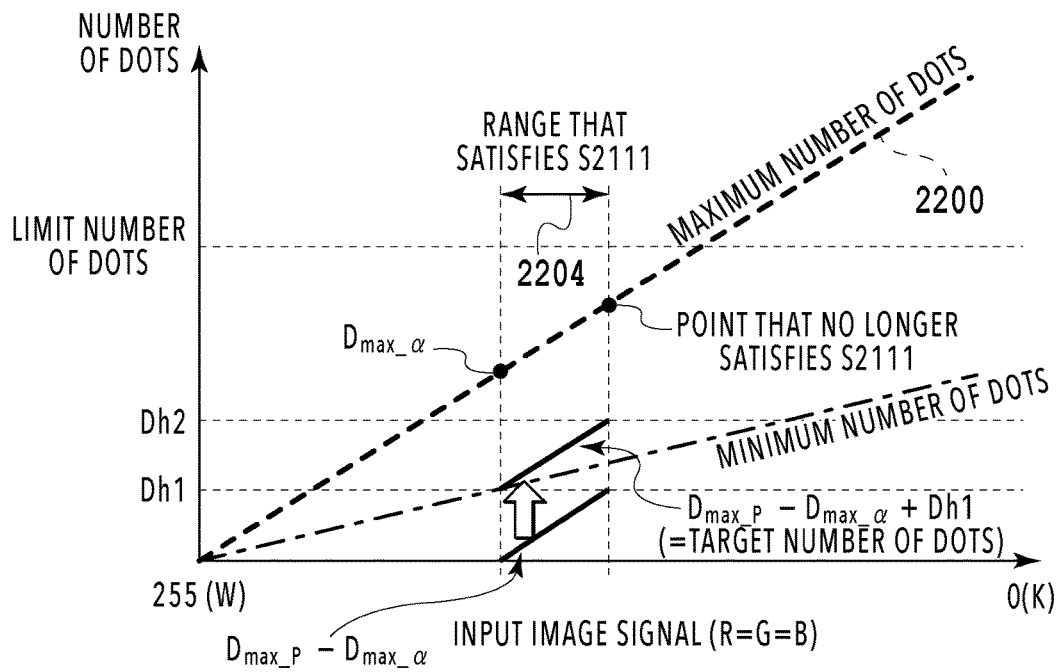

Next, at step 2105, a plurality of numbers of dots that causes the dot pattern after the dither processing to become high dispersion is acquired. Such acquisition of a plurality of high dispersion numbers of dots like this is the point different from the first embodiment. Here, it is assumed that two numbers of dots (50% and 25%) whose dispersibility is the highest and the second highest are determined based on the dispersion characteristic table in FIG. 13 from the range smaller than or equal to the maximum number of dots, larger than or equal to the minimum number of dots, and smaller than or equal to the limit number of dots. FIG. 22B is a diagram corresponding to FIG. 14B of the first embodiment and the two numbers of dots whose dispersibility is the highest and the second highest, that is, 50% and 25% are indicated by Dh2 and Dh1, respectively.

Then, at step 2106 to step 2117 that follow, the target number of dots at each point on the line of interest is set.

First, at step 2106, a point on which attention is focused on the line of interest is determined. Then, at step 2107, for the determined point of interest, whether Dh1 is larger than a maximum number of dots Dmax_p at the point of interest is determined. In the case where Dh1 is larger than Dmax_p, the processing advances to step 2108 and the maximum number of dots is set as the target number of dots. On the other hand, in the case where Dh1 is smaller than or equal to Dmax_p, the processing advances to step 2109.

At step 2109, for the determined point of interest, whether Dh1 is larger than or equal to a minimum number of dots Dmin_p at the point of interest is determined. In the case where Dh1 is larger than or equal to Dmin_p, the processing advances to step 2110 and the high dispersion number of dots of Dh1 is set as the target number of dots. On the other hand, in the case where Dh1 is smaller than Dmin_p, the processing advances to step 2111.

At step 2111, for the determined point of interest, whether a difference between Dh2 and Dh1 is larger than a difference between the maximum number of dots Dmax_p at that point in time and a maximum number of dots Dmax_α in the case where Dh1 becomes equal to the minimum number of dots is determined. In the case where the difference between Dh2 and Dh1 is larger than the difference between Dmax_p and Dmax_α, the processing advances to step 2112 and "Dmax_p−Dmax_α+Dh1" is set as the target number of dots. On the other hand, in the case where the difference between Dh2 and Dh1 is smaller than or equal to the difference between Dmax_p and Dmax_α, the processing advances to step 2113. FIG. 22A and FIG. 22B show the outline of the processing at step 2111 and step 2112. In FIG. 22A, a point 2201 indicates the maximum number of dots Dmax_p at any point in time, a point 2202 indicates the time at which Dh1 becomes equal to the minimum number of dots, and a point 2203 indicates the maximum number of dots Dmax_α in the case where Dh1 becomes equal to the minimum number of dots. Then, as shown in FIG. 22B, in the range indicated by a bidirectional arrow 204, the difference between Dh2 and Dh1 is larger than the difference between Dmax_p and Dmax_α, and therefore, "Dmax_p−Dmax_α+Dh1" is set as the target number of dots. By the processing such as this, the high dispersion number of dots is shifted from Dh1 to Dh2 with the same slope as that of a broken line 2200 indicating the maximum number of dots.

At step 2113, for the determined point of interest, whether Dh2 is larger than or equal to the minimum number of dots Dmin_p at the point of interest is determined. In the case where Dh2 is larger than or equal to Dmin_p, the processing advances to step 2114 and the high dispersion number of dots of Dh2 is set as the target number of dots. On the other hand, in the case where Dh2 is smaller than Dmin_p, the processing advances to step 2115 and the minimum number of dots Dmin_p is set as the target number of dots.

Then, at step 2116, whether the target number of dots has been set for all the points on the line of interest is determined. In the case where there is an unprocessed point, the processing returns to step 2106, and the next point of interest is determined and the processing is continued. On the other hand, in the case where the target number of dots has been set for all the points, the processing advances to step 2117.

Lastly, at step 2117, whether the processing of all the lines has been completed is determined. In the case where there is an unprocessed line, the processing returns to step 2101, and the next line is determined to be the line of interest and the processing is continued. On the other hand, in the case where the processing of all the lines has been completed, this processing is terminated. The above is the contents of the target number of dots setting processing according to the present embodiment.

Figure 23A:
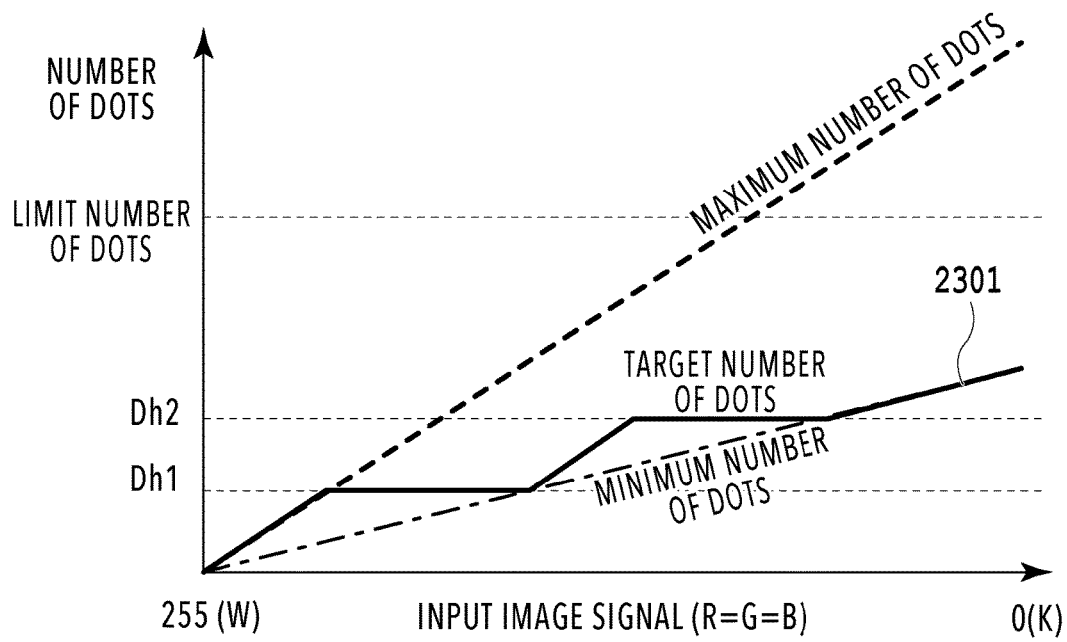
FIG. 23A and FIG. 23B are examples of results of performing setting processing of a target number of dots of the second embodiment.
Figure 23B:
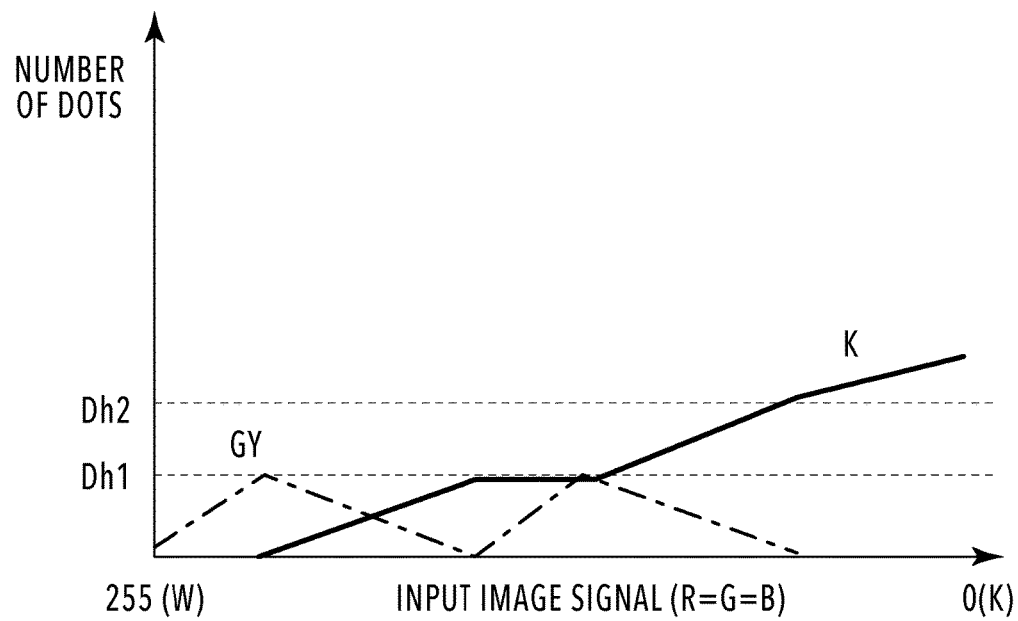

FIG. 23A and FIG. 23B are diagrams showing examples of performing the target number of dots setting processing for each point of interest on the W-K line. FIG. 23A is a diagram corresponding to FIG. 14B of the first embodiment and FIG. 23B is a diagram corresponding to FIG. 16 of the first embodiment. In FIG. 23A, the target number of dots set for the W-K line is indicated by a thick solid line 2301. From FIG. 23A and FIG. 23B, the following fact is known. First, in the highlight area, by setting the target number of dots and the maximum number of dots to the same number, Dh1 is reached in the shortest time. Further, in the intermediate area, by setting the slope of the change from Dh1 to Dh2 to the same slope of that of the maximum number of dots, only the number of dots of the gray ink, which is a pale-color ink, is increased without changing the number of dots of the black ink, which is a dark-color ink. Due to this, it is possible to monotonically increase the number of dots of the black ink that is visually conspicuous, and therefore, deterioration of gradation properties can be suppressed. Further, in the shadow area, by setting the target number of dots and the minimum number of dots to the same number, ink consumption is minimized.

As described above, by setting the target number of dots stepwise, compared to the first embodiment, it is possible to perform printing excellent in granularity while reducing ink consumption. In the case where the portion at which the target numbers of dots set stepwise switch is conspicuous to the eye, it is possible to make an improvement by setting smooth the point of inflection of the target number of dots of each line as in FIG. 20A described previously.

OTHER EMBODIMENTS

It is possible to implement the present invention also by processing in which a program implementing one or more functions of the above-described embodiments is supplied to a system or an apparatus via a network or a storage medium and one or more processors in a computer of the system or the apparatus read and execute the program. Further, it is possible to implement the present invention also by a circuit (for example, ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

An object of the present invention is to enable color conversion processing that guarantees a dot pattern whose dispersibility is high in halftone processing by a dither method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151535, filed Aug. 4, 2017 which is hereby incorporated by reference wherein in its entirety.

What is claimed is:

1. A color conversion LUT creation apparatus comprising:
a derivation unit configured to derive an output value corresponding to an input value in an input image for a plurality of virtual color materials whose number is smaller than a number of actual color materials used in an image forming apparatus;
a setting unit configured to set a target number of dots of the actual color material, which is a target of a number of dots printed per unit area; and
a conversion unit configured to convert an output value of the plurality of virtual color materials into an output value of the actual color material so that a total value of numbers of dots of the actual color material coincides with the target number of dots and to create a color conversion LUT in which the input value and the output value of the actual color material are associated with each other, wherein the setting unit sets the target number of dots based on dispersibility of a dot pattern corresponding to each tone level of a dither matrix used for halftone processing.

2. The color conversion LUT creation apparatus according to claim 1, wherein
the setting unit sets the target number of dots by using a dispersion characteristic table specifying a relationship between dispersibility of a dot pattern and a number of dots, which is associated with a dither matrix used for halftone processing.

3. The color conversion LUT creation apparatus according to claim 2, wherein
the setting unit:
acquires a high dispersion number of dots that causes dispersibility in a dot pattern after the halftone processing to become high by referring to the dispersion characteristic table;
sets, in a case where the acquired high dispersion number of dots is larger than a maximum number of dots of the actual color material for implementing the output value of the virtual color material, the maximum number of dots as the target number of dots;
sets, in a case where the acquired high dispersion number of dots is smaller than a minimum number of dots of the actual color material for implementing the output value of the virtual color material, the minimum number of dots as the target number of dots; and
sets, in a case where the acquired high dispersion number of dots is larger than or equal to the minimum number of dots, the high dispersion number of dots as the target number of dots.

4. The color conversion LUT creation apparatus according to claim 3, wherein
the high dispersion number of dots is:
determined from, in a case where a limit number of dots per unit area that a printing medium can absorb is larger than the maximum number of dots, a range smaller than or equal to the maximum number of dots and larger than or equal to the minimum number of dots; and
determined from, in a case where the limit number of dots per unit area that a printing medium can absorb is smaller than the maximum number of dots and larger than the minimum number of dots, a range smaller than or equal to the limit number of dots and larger than or equal to the minimum number of dots.

5. The color conversion LUT creation apparatus according to claim 1, wherein
the target number of dots is set so that a point of inflection becomes smooth for an increase in tone level in the input value.

6. The color conversion LUT creation apparatus according to claim 1, wherein
the plurality of actual color materials is made up of one or a combination of actual color materials whose hue is the same but whose densities are different, actual color materials identical to the plurality of actual color materials but whose dot sizes are different, and actual color materials having substantially the same hue by mixing another color material.

7. The color conversion LUT creation apparatus according to claim 6, wherein
the maximum number of dots is calculated so that a total of the numbers of dots becomes maximum, based on a combination of actual color materials whose densities are low or a combination of actual color materials whose dot sizes are small of the plurality of actual color materials.

8. The color conversion LUT creation apparatus according to claim 6, wherein
the minimum number of dots is calculated so that a total of the numbers of dots becomes minimum, based on a combination of actual color materials whose densities are high or a combination of actual color materials whose dot sizes are large of the plurality of actual color materials.

9. The color conversion LUT creation apparatus according to claim 1, wherein
an absorption wavelength band of each of the virtual color materials does not overlap one another.

10. The color conversion LUT creation apparatus according to claim 9, wherein
the virtual color materials are consisted of a yellow color material, a magenta color material, and a cyan color material.

11. The color conversion LUT creation apparatus according to claim 1, wherein
the conversion unit converts the output value of the plurality of virtual color materials into the output value of the actual color material based on priority of conversion of actual color materials determined in advance.

12. The color conversion LUT creation apparatus according to claim 1, wherein
the derivation unit derives a virtual color material equivalent amount per dot by converting a spectral reflectance corresponding to results of measuring a single color patch of an actual color material into a block density and converting the block density into the virtual color material.

13. The color conversion LUT creation apparatus according to claim 1, wherein
the color conversion LUT is an LUT used for color conversion processing before halftone processing is performed by using the dither matrix.

14. The color conversion LUT creation apparatus according to claim 1, wherein
the color conversion LUT and the dither matrix are used in an image processing apparatus for generating an image that is output to the image forming apparatus.

15. An image processing apparatus comprising:
a color conversion processing unit configured to perform color conversion processing by using a color conversion LUT created in a color conversion LUT creation apparatus; and
a halftone processing unit configured to perform the halftone processing using a dither matrix for image data after the color conversion processing, wherein
the color conversion LUT creation apparatus comprises:
a derivation unit configured to derive an output value corresponding to an input value in an input image for a plurality of virtual color materials whose number is smaller than a number of actual color materials used in an image forming apparatus;
a setting unit configured to set a target number of dots of the actual color material, which is a target of a number of dots printed per unit area and to set the target number of dots based on dispersibility of a dot pattern corresponding to each tone level of the dither matrix used for halftone processing; and
a conversion unit configured to convert an output value of the plurality of virtual color materials into an output value of the actual color material so that a total value of numbers of dots of the actual color material coincides with the target number of dots and create a color conversion LUT in which the input value and the output value of the actual color material are associated with each other.

16. The image processing apparatus according to claim 15, wherein
the halftone processing unit arranges dots by giving priority to an actual color material whose density is high or an actual color material whose dot size is large of the plurality of actual color materials.

17. A creation method of a color conversion LUT, the method comprising the steps of:
deriving an output value corresponding to an input value in an input image for a plurality of virtual color materials whose number is smaller than a number of actual color materials used in an image forming apparatus;
setting a target number of dots of the actual color material, which is a target of a number of dots printed per unit area; and
converting an output value of the plurality of virtual color materials into an output value of the actual color material so that a total value of numbers of dots of the actual color material coincides with the target number of dots and creating a color conversion LUT in which the input value and the output value of the actual color material are associated with each other, wherein
at the setting step, the target number of dots is set based on dispersibility of a dot pattern corresponding to each tone level of a dither matrix used for halftone processing.

18. The creation method according to claim 17, wherein
at the setting step, the target number of dots is set by using a dispersion characteristic table specifying a relationship between dispersibility of a dot pattern and a number of dots, which is associated with a dither matrix used for halftone processing.

19. A non-transitory computer readable storage medium storing a program for causing a computer to perform a creation method of a color conversion LUT, the method comprising the steps of:
deriving an output value corresponding to an input value in an input image for a plurality of virtual color materials whose number is smaller than a number of actual color materials used in an image forming apparatus;
setting a target number of dots of the actual color material, which is a target of a number of dots printed per unit area; and
converting an output value of the plurality of virtual color materials into an output value of the actual color material so that a total value of numbers of dots of the actual color material coincides with the target number of dots and creating a color conversion LUT in which the input value and the output value of the actual color material are associated with each other, wherein
at the setting step, the target number of dots is set based on dispersibility of a dot pattern corresponding to each tone level of a dither matrix used for halftone processing.

20. The storage medium according to claim 19, wherein
at the setting step, the target number of dots is set by using a dispersion characteristic table specifying a relationship between dispersibility of a dot pattern and a number of dots, which is associated with a dither matrix used for halftone processing.

\* \* \* \* \*